US008738414B1

(12) United States Patent
Nagar et al.

(10) Patent No.: US 8,738,414 B1
(45) Date of Patent: May 27, 2014

(54) METHOD AND SYSTEM FOR HANDLING PROGRAM, PROJECT AND ASSET SCHEDULING MANAGEMENT

(76) Inventors: Ajay R. Nagar, Katy, TX (US); Anouar Jamoussi, Sugar Land, TX (US)

( * ) Notice: Subject to any disclaimer, the term of this patent is extended or adjusted under 35 U.S.C. 154(b) by 322 days.

(21) Appl. No.: 13/338,559

(22) Filed: Dec. 28, 2011

Related U.S. Application Data

(60) Provisional application No. 61/428,859, filed on Dec. 31, 2010.

(51) Int. Cl.
*G06Q 10/00* (2012.01)
(52) U.S. Cl.
USPC .......................................... 705/7.25; 705/7.12
(58) Field of Classification Search
None
See application file for complete search history.

(56) References Cited

U.S. PATENT DOCUMENTS

| | | | | |
|---|---|---|---|---|
| 2006/0041447 | A1* | 2/2006 | Vucina et al. | 705/1 |
| 2008/0077530 | A1* | 3/2008 | Banas et al. | 705/50 |
| 2009/0037921 | A1* | 2/2009 | Simpson et al. | 718/104 |
| 2009/0076880 | A1* | 3/2009 | Kramer | 705/9 |

OTHER PUBLICATIONS

PST Breaks New Management Ground with 'Today's Plan'; Breakthrough in Management Tools Added to MProWeb Will Transform the Way People Manage Time and Businesses, Mar. 15, 2005, Business Wire.*

* cited by examiner

*Primary Examiner* — Peter Choi
*Assistant Examiner* — Alan Torrico-Lopez

(57) ABSTRACT

The invention comprises management of programs and mega-programs with emphasis on project level and above in a hierarchy that enables aggregation of information navigating up, and breakdown of details navigating down the hierarchy. It provides the flexibility of combining real-time management of budget with multiple editions, on call, asset tracking and capacity management of people and non-people resources within the same structure, vendor management, and real-time cross-program interlinking of dependencies and business considerations. The invention enables invocation of each function at every node in the hierarchy and localizes the related information at the invoking source. The functions encompass management of action items, status reports, approvals, meetings/decision making, issues, risks, change management and attachments with built in workflows that enable interactive collaboration and action triggering within the system and across external systems through condition and threshold setting. The universal structure enables management of organization layers and project initiatives.

15 Claims, 21 Drawing Sheets

An Embodiment of the Invention Enabling Management of a Variety of Organizational, Business, Operational, and Administrative Needs and the Flow of Information in the Hierarchy An Embodiment of the Invention Enabling the Panes in a Graphical User Interface the Ability to Organize, Access, Display and Monitor Functions and Their Pertinent Information An Embodiment of the Invention Enables Each Node or a Source to Create Items in Categories, Create Activities, Link to Items, Schedule against Teams, Systems or Processes, and Track Progress An Embodiment of the Invention Enables Each Node or a Source to Invoke and a Report,
Consolidated Reports and Look Ahead Reports, Each Supporting Related Workflows

METHOD AND SYSTEM FOR HANDLING PROGRAM, PROJECT AND ASSET SCHEDULING MANAGEMENT

CROSS REFERENCE TO RELATED APPLICATIONS

This application claims the benefit of provisional application U.S. Ser. No. 61/428,859, filed on Dec. 31, 2010, which is hereby incorporated by reference in its entirety.

BACKGROUND OF THE INVENTION

1. Field of the Invention

This present invention pertains to computerized method and software system for automating manual processes for handling very large programs (comprising of a nested hierarchy of projects) to small projects to, including tracking and reporting of all pertinent governance-related activities, documents, assets and resources.

2. Description of the Related Art

The economic growth in the last decade combined with globalization has resulted in a huge increase in large and colossal initiatives and their activities are spread across borders and continents. Mega programs can include many programs which in turn include several projects have become a necessary form of accomplishing small, medium and large implementations to enable different groups, possibly geographically dispersed, to perform work discretely while having functional managers, program and project managers tie the inter-connectivity relationships between different projects, programs and mega programs throughout the delivery lifecycle. These implementations can be related to industry specialization such as Information Technology Systems (IT), Software and hardware developments, outsourcing management, building and constructions, shipyard building, education and health systems, oil, gas and chemical processes and many other industry segments that require management of methodology and processes.

Effectively handling the scope, effort, budget, asset and people resource scheduling, risks, collaboration, day-to-day activities, status and progress activities across every level of individuals that include technical, functional administration, management and executives is challenging in many aspects.

Effectively handling the management of multi-tiered mega programs, programs and projects that large corporations require to manage their subsidiaries, departments, divisions, teams and initiatives is challenging in many aspects. Various patents and patent applications propose point solutions for managing risk through defined user criteria, creating requirements, generating staffing forecast reports either through a one-off approach, or by generating forecasting reports. U.S. Pat. No. 8,065,177 issued to Puccio et al. and incorporated by reference in its entirety for all purposes, is directed producing a risk score corresponding to an expected risk associated with the project. Quoting its abstract "A request for completing a project is received, including first information regarding the project. At least one person for completing the project is determined based on the first information. Second information regarding the project is also received, and instructions for completing the project are identified based on analysis of the second information. The instructions include a plurality of actions to be performed by the at least one person, including the creation of at least one document using a standardized template. The performance of the actions by the at least one person in completing the project is automatically tracked".

The current project structure further lack cohesiveness and seamless operations of supporting functions such as approvals, meeting decision tracking, independently defined and stored business considerations that can be dynamically associated to their localized activities, action items and attachments with workflows that can be associated with each source of activity, and conditions and threshold capability to trigger other actions. To harness these capabilities, companies purchase separate disparate tool sets to perform these actions, and manage them outside of their existing applications, or integrate them through custom development that then result in a creation of a mesh of disparate applications made to work together through interfaces and other means. U.S. Pat. No. 8,073,799 issued to Baldwin et al. is directed to generating requirements from end-users. Quoting an abstract, the Baldwin patent describes "a framework is created for decomposing and categorizing organizational information into data elements that are stored in a data repository. A relationship is defined between elements [and . . . ] requirements for the project are determined from the end-user [and . . . ] a standards requirement document is generated and periodically updated using the mapped data elements from the data repository".

Exiting patents and solutions are geared towards point solutions or a very finite activity. Some vendors or patents provide a point solution for managing assets that are typically non-people related items. Others provide a contained solution for people capacity, while yet others provide a solution for scheduling, a finite solution for reporting and so on. They lack the flexibility of tracking a both non-human and human activities within the same method (or solution), and are further limited in the depth of how the capacity is managed thus limiting the automation of interactive collaboration between people, system and processes. Further, the capacity model may lack capability to define maximum limit per each time unit (i.e., each day, week, month, quarter, year), compute and display the utilized capacity, the remaining capacity, etc., the ability to select any one of many performing teams or system's calendar, schedule the required time-unit against the available time-unit against the available capacity of the resource, team or system, invoke a workflow to manage request-approve-decline actions collaboratively, assign resources to the activities that need to be performed, the ability to monitor the workflow progress, warning flags etc. and the ability to set conditions and thresholds that can trigger other actions. The lack of this end-to-end asset storing, scheduling and progress tracking and reporting inhibits the resources required to be assigned to the requested activity automatically, and further precludes the resource manager and resource-owning system the view of realizing the spread of its resources across all the activities and by what capacity, while conversely, precludes the activity owner the view of which all resources are assigned to a one activity within what capacity. Further, the commercial tools are specifically designed to manage y people, or physical entity, but not both. U.S. Pat. No. 7,962,358 issued to Fernandez et al. is directed to generating reports for resource forecasts. Quoting its abstract, the Fernandez patent describes a "system for project forecast and resource forecast management [and . . . ] the input component receives resource inputs related to actual resources [and] generates a resource forecast of actual resources and placeholder resources, and generates a project forecast of approved projects and proposed projects [and] includes a reporting component that generates a report on the resource forecast and the project forecast for the display in the display component of the GUI; the reporting component generating the report for at least one of a resource level, a role, and a project level".

Although various segments of project management have been addressed in the patent literature, problems remain in handling cohesively a structure above project level hierarchy, typically a nested structure of mega large programs that contain large programs, programs that contain many projects etc. in the hierarchy, which can manage with ease and flexibility both the deliverable initiatives as well as top-down organization management of its subsidiaries, divisions, departments and teams. Microsoft Project and Oracle's Primavera are two such widely used examples which manage activities from project level and below, what are commonly known as activities or tasks within a project, and are designed to manage deliverable initiatives only. All aspects and complexity of the inter-dependency across mega programs, programs and projects becomes very difficult, or practically impossible to manage through a software application or method that is designed to perform tasks starting from project level hierarchy and below. Further, lack of seamless availability at every node or activity the critical supporting functions such as approvals, action items, meeting management, asset scheduling/progress tracker, capacity management etc., require significant laborious effort to track these actions through other means, and to reproduce the information speedily when required, inducing enormous effort to extract information from all these other systems and spreadsheets to create and sequence everything together, like putting all pieces back in a puzzle.

SUMMARY OF THE INVENTION

Other objects and advantages of the present invention will become apparent from the following descriptions, taken in connection with the accompanying drawings, wherein, by way of illustration and example, an embodiment of the present invention is disclosed.

The present invention provides a system to create structure of multiple tiers of nested nodes that will enable management of mega program, program and project level initiatives. Each node enables creation of multi-tiered sub-nodes, and the invention creates a link between the two levels in the form of parent-children relationship to allow management capabilities of each node and its associated function in a hierarchical structure. Each node provides a step-down to children nodes or step-up to parent node capability through each level of hierarchy while supporting access, management of information, progress information, warning/flag indicators and other available information for the parent and children nodes.

The present invention provides the means to define and apply weight to each node's activity, and aggregate the progress percentage each level up the hierarchy while providing control to override the resulting value with another one, and to propagate the information flow manually or automatically.

The present invention provides the means to derive the resulting status for a parent node by performing Boolean logic on the status indicators of the children nodes, and enables the resulting value to be overridden at every node, while providing control to override the resulting value with another one, and to propagate the information flow manually or automatically.

The present invention enables creation of business consideration items at any node independently, and provides the means to link the consideration items to any other node in the hierarchy that results in creating a linked relationship between the consideration items and the invoking node, and provides real-time access to its content, instructions and attachments from the invoking node. Conversely, the linked node information is accessible from the linked consideration items. The invention creates a relationship that provides visibility of the other nodes from each linked node. Inbuilt workflows enable actions to be invoked based on conditions set.

The invention enables any node in the hierarchy to be interlinked with another other node, creating a linked dependency relationship, and enables real-time access to its information including progress and warning flags from either node that are otherwise managed independently under their own mega program, program, project structure. The invention creates a relationship that provides visibility of the other nodes from each linked node. Inbuilt workflows enable actions to be invoked based on conditions set.

The invention additionally provides statistical and graphical representation in multi-dimension format of the children's nodes' timeline in relation to one another, progress, dependency indicators and other information when the function is invoked from a parent node. The dependency indicators enable dynamic access to the dependent node's timeline that will provide all the pertinent information of the dependent node and its owning parent and children nodes in an identical multi-dimension format. The invention provides the means to flip-flop between each dependent node and its associated parent-children nodes, their timelines, warning indicators and other pertinent information. This step through each dependency capability enables a person to propagate through the chain of dependencies while consuming the status and impact information to the related nodes. Inbuilt workflows enable actions to be invoked based on conditions set.

The present invention provides the means to create dynamic status reports with user, system or process defined categories and sub-categories, related description, status, risk and issues progress, with inbuilt workflows that enable actions to be invoked based on the conditions set, and provide its progress status, warning indicators and other pertinent information. Status Reports can be invoked and linked to every node, and the invention enables the information to be summarized at each level as it is propagated upwards in the hierarchy automatically or manually through controls. Each node can invoke the status report and its related information is linked and localized to that node for speedy reproduction of the localized data that is relevant to the node.

The present invention additionally provides the means to track approvals, action items, meeting minutes and decisions, look ahead capability and attachment association, with each function supporting workflow capability that enable actions to invoked based on the condition set, and providing its progress status, warning indicators and other pertinent information. Each function can be invoked from every node and its related information is linked and localized to that node for speedy reproduction of the localized data that is relevant to the node. The collection of these functions provides governance capability for each node's activity.

The present invention provides the means to manage budget with capability of creating editions such as planned, approved, to-date, human and non-human capacity management, issue and risk tracking, change management and vendor relations at every node in the hierarchy. Each function supports workflow capability that enable actions to be invoked based on the condition set, and provides its progress, warning indicators and other pertinent information. Each node in the hierarchy can invoke these functions and the related data from each function is localized at the invoking node for speedy access and reproduction of the localized data that is relevant to the node.

The present invention additionally provides the means to manage asset tracking, scheduling and progress tracking capability that enable assets to be categorized, linked to activities, scheduled against multiple team or system's calendars that provide interactive capacity limit-utilized-availability capability across each time such as each day, week, month, etc., and track the scheduled item-activity pair's progress interactively and collaboratively. Workflows at each item and at the scheduled activity enables actions to be invoked based on the conditions set, and provide its progress, warning indicators and other pertinent information. Each node in the hierarchy can invoke this function and the related data and information is localized to the invoking node for speedy reproduction of the localized data that is relevant to the node.

The present invention can interface with any other system to import data that can be used to as input to the system's functions, or export data of its functions and nodes to other systems.

The present invention constructs statistical, graphical and other format reports by combining any of the available functions within the system or that received from external systems in any acceptable format.

BRIEF DESCRIPTION OF THE DRAWINGS

The accompanying drawings, which are included to provide further understanding of the invention and are incorporated in and constitute a part of this specification, illustrate embodiments of the invention. Understanding that these drawings depict only typical embodiments of the invention and are not therefore to be considered limiting of its scope. In the drawings

DETAILED DESCRIPTION OF THE EXEMPLARY EMBODIMENTS

Figure 1:
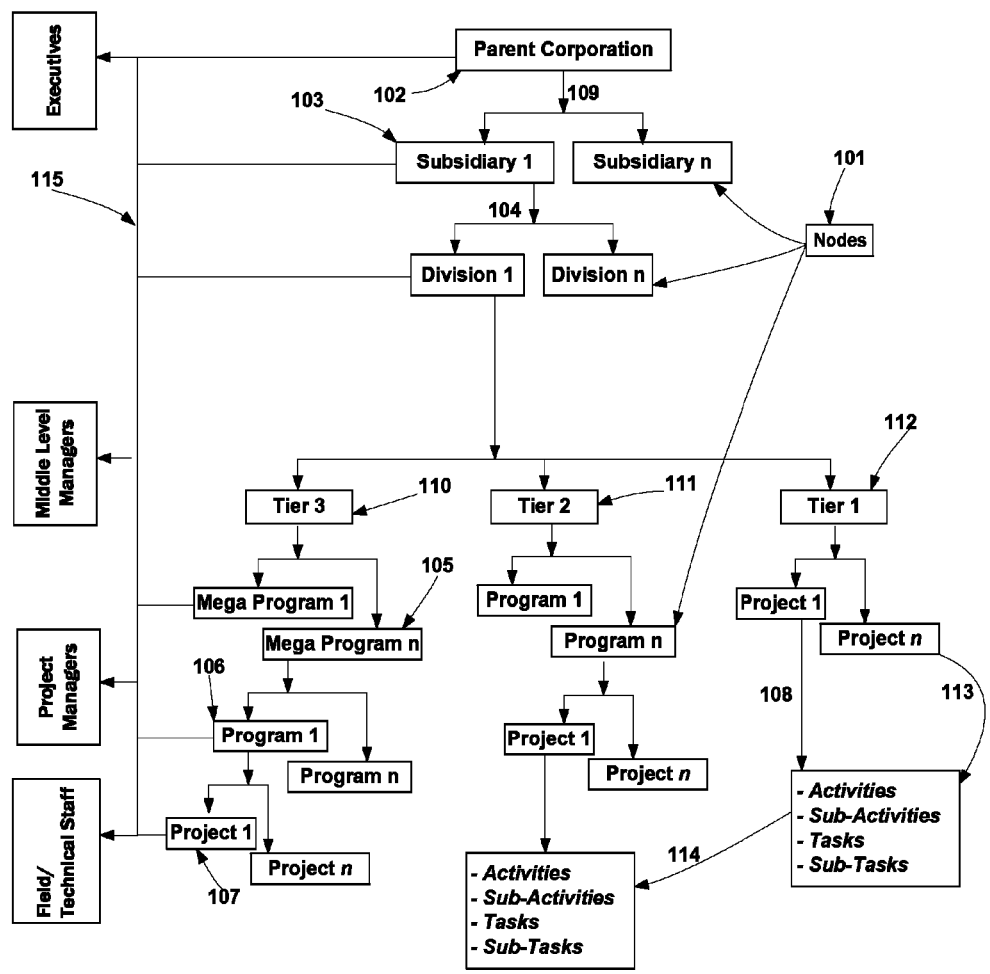
FIG. 1 illustrates an embodiment of the invention to enable management of a variety of organizational, business, operational, and administrative needs and the flow of information in the hierarchy.

The present invention provides a method and a system for automating the processes involved in handling the full range from very large programs (referred to as Mega Programs, to nested Programs and Projects) in a hierarchical structure and managing the pertinent governance issues. The structure universally applies to managing initiatives commonly referred to as programs and projects, as well as a corporation's organization structure and initiatives at each level of the organization, with the ability to propagate information and summary to each level upwards. This can include, but is not limited to, parent company at the highest level, nested subsidiaries, nested divisions, nested departments, nested teams and nested initiatives and projects under teams or at any upper level.

The present invention provides a system, which can also mean multiple systems. In one embodiment the system of the present invention will incorporate a method, which can also mean multiple methods, according to the present invention. The system can include physical and/or logical components. Physical components mean the actual hardware, including servers, workstations, network connectivity and other devices that integrate with them. The logical components mean software, operating system, user interfaces, method architecture, programming code, programming and/or development tools, other applications, etc.

The system can have agents that can be installed and/or run on server systems, user sessions (e.g. Web browsers) and/or other systems. The agents can run as processes, tasks, APIs, event-driven, listener etc.

The methods of the present invention can be implemented as a combination of software that can be built in conjunction with other logical and/or physical components, and can operate in conjunction with other logical and/or physical components. The system of the present invention can contain one or many logical and/or physical components. The inventive system, which will facilitate the inventive methods, can integrate and function with other systems. These can be any business support systems provided by other commercial software vendors or developed in-house by the customer.

The methods can include several components, such as architectural bases, block components, interfacing components (drivers, APIs etc.), user interfaces (to present information to users), batch interfacing for exchange of data, scheduling facility, interfaces with databases, sockets, data storage systems, networking systems, security systems, our agents, etc.

The inventive system allows the creation of multi-tier hierarchical program structures. The system includes a wizard for user to generate these structures. While constructing these structures, they can be stored also in draft mode, and later activated to be used in production mode when ready. Virtually unlimited nested tiers can be generated. In the current embodiment/implementation of the system, we provide at least three unique multi-level types of nodes. The number of nesting within each type is virtually unlimited. The top node type will model one or more nesting layers of mega-programs, each mega-program can have one or more nesting layers of programs below it, and each program can have one or more nesting layers of projects below it. The middle node type will model one or more nesting layers of activity groups that are nested under a project node from any layer of a project node. The bottom node type will model one or more nesting layers of tasks that are nested under an activity group node from any layer of activity group (a task could be created under the top activity group, any in-between activity groups or last activity group).

Once the program structures are activated, they can be accessed and managed via a tree control.

Each node in the tree will provide menu options that when selected will allow invocation of that function against the object represented by the node. All features and functions in the system that are pertinent to that object can be invoked through these menu options.

The system allows creation of custom short cuts (favorites) to a particular function against a specific node as selected by the user.

By selecting a node from the tree, its child nodes are listed to the right of the tree in a LIST VIEW mode or Graphical User Interface (GUI) pane, showing a summary of all its attributes (data fields). The view is scrollable horizontally and vertically to display all data. Fly-out help labels are displayed as the cursor moves over values. The cells (or data) can be hyper-links to another tree node or UI function when clicked by the user. For example, the implementation of dependent node can link activities or tasks within the scope of a single project of across projects. Each node displayed in LIST VIEW will contain functions (buttons) to EDIT, DELETE and other functions that can be invoked.

By selecting a node from the tree, the detail attributes (all fields) of that node will be displayed to the right of the tree, below List View, called the DETAIL PANE. The detail fields of the node are organized in groups that are accessible by named tabs. A node from LIST VIEW, if selected, will also display its detail fields in the DETAIL PANE below the List View.

Automating hierarchical representation of projects and their elements with the ability to aggregate information downwards, meaning from mega-projects, to sub-projects to their tasks and sub-tasks, and upwards, meaning from sub-tasks to the mega projects. An example of information aggregation and escalation is risk weighted percent complete values and their associated flags. These values can also be overridden by a user with the necessary authority (e.g., manager) before escalating upward.

Automating upward of propagation and consolidation into powerful, concise, intuitive displays and reports, summarizing the essence of all underlying complexities of the mega projects as often required by non-technical and technical top level management and executives. Examples are delays incurred at any level in any activity of the mega-projects and its subordinates, budget overruns, compliance, regulations and policy warnings, human and non-human resource issues and customer satisfaction and quality issues.

The functions of the inventive system fall into two categories, "Business Function(s)" and "Assist Function(s)". The Business Functions provide the means to manage complex operations across each node and hierarchy structure to enable the end-to-end management of activities and can be invoked at each node of the tree, while the Assist Functions provide supporting operations to each node (or activity) that performs a smaller, but specific action(s) to support 1) end-to-end management through each structure in the hierarchy, and 2) each Business Function.

Throughout the Business and Assist Functions, the system provides the ability to display pertinent status/descriptive/statistical information graphically, textually and statistically (charts and tables).

End-to-end program life-cycle management includes the creation of a program structure with multiple nested hierarchical nodes (virtually unlimited number of layers) that can be categorized as but not limited to, mega programs, programs and projects. The unique aspects of this feature include the simple way of creating a draft structure and adding nodes to it and the ability to activate the structure through the activate function and make it available to the production active structures. Also unique is the integration of all the functions in a single UI view as listed below, but are not limited to:

1. Ability to select any node from the hierarchy from one pane.
2. Ability to display critical information of the lower/subordinate nodes summarized in the list view in a second pane (top right side) with scrolling ability.
3. Ability to select the detail view of a lower either from the tree or from the list view in order to browse or edit the detailed contents of that subordinate node, which are organized in tabbed groups with scrolling ability).
4. Ability to invoke any pertinent assist/support function or feature from any tree node while in the same user interface view.
5. Ability to customize the view with function short-cuts for quick function invocation.
6. Ability to access different functions through hyper-links available on the data lines displayed in the list views.

7. The list view provides quick access the status report. It also provides an indicator whether an updated status report has been posted.

Business Function, "Critical Path and Timeline", provides support for the functions as listed, but are not limited to:
1. Can be invoked from any node of the structure tree.
2. Displays info pertinent to all associated nodes including the pathname of the displayed nodes.
3. Displays info on a time based scale (years, months, weeks, days, hours, etc.).
4. For each displayed node, the duration is graphically presented along with start and end date indicators.
5. It shows dependencies between nodes, such as pre-requisite, post-requisite, etc.
6. Selecting any node from the timeline chart, the method allows for traversing and displaying the dependency links in relation to time, reference, or any other relationship criteria.
7. Ability to directly access the details and status of any node in the dependency/timeline charts.
8. Ability to do all of the above plus the standard UI features of the application (1—favorite links, 2—access of any node from the tree which is still available in a different pane, 3—ability to select any assist or major feature from the tree).
9. Ability to set conditions and thresholds that trigger actions across other functions within the system and external systems.
10. Ability to flip-flop between the inter-dependent nodes and their related structure.

Business Function, "Asset Tracking and Scheduling", provides an end-to-end structure to create and track assets by category, define activities, link each asset (also known as item) to one or more activities, create capacity-based scheduler for the performing teams or systems, automate assignment of the item-activity pair against the available capacity of a selected team/system, and manage the defined deliverables and the progress, while providing real-time reports. The system has built in scheduling and calendaring function to allow each item to be scheduled against a user-defined maximum capacity across a day, week, month, year etc. The system allows for creation of multiple calendars (the notion of teams), each one can be assigned to a specific type of resource or set of resources (human resources, equipment, assembly line etc.). Through items type, zoning, grouping etc., the system allows for grouping of items with specific criteria for each set of activities. The scope of the scheduling capacity can be across one or cross-nodes. Such a node could represent a project, program or mega program. Scheduling of activities for items allows for chronological sequencing of activities, tracking of status and progress, and approvals. Sequencing of activities allows pre and post requisite dependencies to ensure that certain activities are executed in the proper order (bolts secured before the engine is mounted). The system allows interactive means of tracking capacity values by each time unit such as day, week, month, quarter etc. with in-built "Maximum Capacity", "Utilized Capacity" and "Available Capacity" within calendars of each performing team or system that efficient and error-free scheduling of items against available capacity. The system allows tracking of status and progress of the complete lifecycle of each activity from planning, to scheduling, executing and completion. The system further allows for proper approvals to be solicited and secured as part of the execution workflow of the activity. Further, multiple approvals can be sequenced in their order of importance. Finally, the system provides real time reporting of lifecycle flow of items, their related activities including progress and status of approvals and execution. The system also provides high level management type of statistical information such as dashboards and collective summaries of past, current and planned executions, historical analysis and future trends.

Business Function, "Resource Capacity Management", provides support for the functions as listed, but are not limited to:
1. Ability to associate resources and their work units (e.g. Hours) at any node to enable the resources' assignment to the invoking node (a mega program, project or a task), and a resource can be a human or non-human physical (e.g., electronics) or logical item.
2. Provides workflow management to request resources, manage the approval (or decline) and notification iterations with status monitoring, and other operations.
3. Ability to allocate work effort (e.g. hours or days) to resources across each specified time period (e.g. each day, week, month, etc.) through a calendar-based scheduling system.
4. Ability to manage the workload of each resource.
5. Ability to do all of the above plus the standard UI features of the application (1—favorite links, 2—access of any node from the tree which is still available in a different pane, 3—ability to select any assist or major feature from the tree, 4—list view, 5—hyperlinks in the list view, 6—ability to add/edit a resource request).
6. Ability to report and view all the resources and their specific effort-unit values assigned to each node.
7. Ability to report and view each resource and its specific effort-unit assigned across all the nodes.
8. Ability to set conditions and thresholds that trigger actions across other functions within the system and external systems.

Assist Function, "Status Report Management", provides the ability to track the status information real-time from low-level nodes to be escalated to parent nodes above it, one level at a time. The information propagated includes description, color status flags depicting criticality, pertinent progress status, pertinent issues and risks for each major category of activity. The owner/manager of the parent node has the option of overriding some of the information or accepting the accumulated/aggregated information coming from below through user specified/configurable logic before forwarding it upward. The executive/management can receive real-time a status report at the highest node and can drill down through the hierarchy of the nodes from the highest node to the lowest node of the hierarchy for details.

Business Function, "On Call Management", provides support for the functions as listed, but are not limited to:
1. Ability to record, track, manage and publish On Call and shift related information lists pertaining to who's on the call list during what start-end duration of days, weeks, months etc.
2. Allows entry and publishing of names of individuals, their phone contacts, the order of the call, the duration of wait before invoking the next shift person on the order, alert type and other information.
3. Allows On Call lists to be grouped by labels, start/end dates, active/closed/future status, and by the types of applications, systems, sites etc.
4. Allows ability to publish the recorded information to other departments, groups, etc.
5. An order of escalation, and time duration is associated with each individual on the list which allows for tracking and managing service level agreements (SLA's) of an organization or company, and allows the appropriate help desk or call/support center to invoke escalation of calls to appropriate individuals as the time limit is reached for previous person and no response is received.
6. Ability to display graphically the On Call list information, both descriptive and statistical information.
7. UI functions: 1—favorite links, 2—access of any node from the tree which is still available in a different pane, 3—ability to select any assist or major feature from the tree, 4—List View displaying summary/status, 5—hyperlinks via list view for quick access, 6—Add/Edit new on-call lists with the ability to add multiple names to a list and their pertinent profile, phone, email contact, escalation trigger time, call order in the list, alert/notification, etc.
8. Ability to set conditions and thresholds that trigger actions across other functions within the system and external systems.

Business Function, "Budget Management", provides support for the functions as listed, but are not limited to:
1. Ability at each node to create, manage, track, and display budget related information.
2. Provides a workflow for planning, approving, projecting and controlling (to-date/actual) budget editions and other operations.
3. Ability within each edition to create different types of user-specified categories along with profile information such as owner, estimated/committed start and dates etc.
4. Under each category, ability to create lines items pertaining to that category in a nested format.
5. Ability to enter monetary amounts for expenses and capital charges for each line item.
6. Ability to track progress and status of line items and categories.
7. The total of line items are aggregated and displayed for the owning category.
8. The total of all categories are aggregated and displayed at the edition level.
9. All editions can be displayed separately or together on the same view for comparison purposes.
10. Tracking and monitoring of current/actual expenditures against the budget.
11. Warnings will be flagged when expected or actual expenditures surpass allocated/approved amounts.
12. Alerts in case of budget overruns.
13. Ability to display graphically in charts the status of the budget.
14. UI functions (1—favorite links, 2—access of any node from the tree which is still available in a different pane, 3—ability to select any assist or major feature from the tree, 4—list view, 5—hyperlinks in the list view data, 6—selection of the editions, 7—adding/editing categories to an edition, 8—adding/editing line items to a category, 9—aggregate value displays of line items, categories, and editions).
15. Ability to set conditions and thresholds that trigger actions across other functions within the system and external systems.
16. Ability to receive or send data to and from other functions within the system, for example, Vendor Management, and external systems, for example, ERP financial applications.

Business Function, "Issue Management", provides support for the functions as listed, but are not limited to:
1. Ability to associate, manage, track and report issues at any node of the tree.
2. Ability to add issues and sub-issues in a nested form; each lower level issue can be treated, tracked, managed and reported as an independent issue while interlinked with a master/parent issue.
3. Ability to manage workflow of the lifecycle of an issue.
4. Tracks profiling information via organized tabs, such as issue source, environment it occurred in, and other pertinent supporting details.
5. Manages the diagnosis workflow of an issue and invokes work order related activities to complete the tasks related to address and resolve the issue.
6. Ability to escalate issues via status flags, percentage complete and other means. These are invoked manually or through computed logic.
7. Ability to list all entered issues and their related status and a summary of other information (textual and statistical).
8. UI functions: 1—favorite links, 2—access of any node from the tree which is still available in a different pane, 3—ability to select any assist or major feature from the tree, 4—list view showing statistical and descriptive information, 5—ability to add/edit issues, 6—ability to manage grouped details of an issue via organized tabs, 7—ability to centralize/segregate issues across programs and pertinent sub-nodes or segregate issues by user selectable nodes, 8—ability to generate and display issues status, summary and statistical information graphically.
9. Ability to set conditions and thresholds that trigger actions across other functions within the system and external systems.
10. Ability to receive or send data to and from other functions within the system, or external systems.

Business Function, "Risk Management", provides support for the functions as listed, but are not limited to:
1. Ability to create a nested structure to manage, track and report concerns as risks in order to allow the user to proactively address them.
2. Ability to track the lifecycle of the progress of these risks from inception to current progress, to plans to mitigate, to completion.
3. Workflows that enable interactive collaboration and updates.
4. Ability to associate risks to each node or centralize across all nodes.
5. Ability to display critical status information via flag indicators, warning, notifications, alerts, etc.
6. Ability to add risks and sub-risks in a nested form; each lower level risk is treated, tracked, managed and reported as an independent risk while interlinked with a master/parent risk.
7. UI functions: 1—favorite links, 2—access of any node from the tree which is still available in a different pane, 3—ability to select any assist or major feature from the tree, 4—list view showing statistical and descriptive information, 5—ability to add/edit risks, 6—ability to manage grouped details of a risk via organized tabs, 7—ability to centralize/segregate risks across programs and pertinent sub-nodes or segregate risks by user selectable nodes, 8—ability to generate and display risks status, summary and statistical information graphically.
8. Ability to set conditions and thresholds that trigger actions across other functions within the system and external systems.
9. Ability to receive or send data to and from other functions within the system, or external systems.

Business Function, "Change Management", provides support for the functions as listed, but are not limited to:
1. Ability to create a nested structure to manage, track and manage change requests.
2. Ability to track the lifecycle of the progress of these change requests, from inception to current progress, to plans to mitigate, to completion.
3. Workflows that enable interactive collaboration and updates.
4. Ability to associate issues, risks, information from other nodes, interlinking Business Considerations and inter-node dependencies.
5. Ability to display critical status information via flag indicators, warning, notifications, alerts, etc.
6. Ability to add change request and sub-change requests in a nested form; each lower level change request is treated, tracked, managed and reported as an independent risk while interlinked with a master/parent change request.
7. UI functions: 1—favorite links, 2—access of any node from the tree which is still available in a different pane, 3—ability to select any assist or major feature from the tree, 4—list view showing statistical and descriptive information, 5—ability to add/edit change requests, 6—ability to manage grouped details of a change request via organized tabs, 7—ability to centralize/segregate change requests across programs and pertinent sub-nodes or segregate risks by user selectable nodes, 8—ability to generate and display change request status, summary and statistical information graphically.
8. Ability to set conditions and thresholds that trigger actions across other functions within the system and external systems.
9. Ability to create and or update existing change requests by flow of information from other functions such as Issue and Risk Management, node warning indicators etc. in automated, manual and other modes.
10. Ability to receive or send data to and from other functions within the system, or external systems.

Business Function, "Vendor Management", provides support for the functions as listed, but are not limited to:
1. Ability to create a nested structure to manage, track and report vendor or third party (called vendor for simplicity) engagement information as pertains to a user department or company.
2. Ability to process each vendor and its associated vendor companies in a nested form. Each nested vendor can be treated as an independent vendor tracked, managed and reported independently of the owning master vendor, while being interlinked with a master/parent issue.
3. Ability to track the workflow of adding request/process/approve/decline flow that can be entered by any user of the method.
4. Ability for the request receiving group/department to process the request, take appropriate actions to fulfill (or reject) the action, and update the flow/progress status.
5. Ability of the using company (or corporation, or department) to manage its vendor/entity relationship with other companies to facilitate sale or purchase of goods or services. The target vendor can be further split into multiple vendors via a nested relationship; each one can be managed independently and cross-related directly to the source company.
6. Graphically display source-target vendor relationship, status, descriptive/statistical summary, etc.
7. UI functions: 1—favorite links, 2—access of any node from the tree which is still available in a different pane, 3—ability to select any assist or major feature from the tree, 4—List View displaying summary and status, 5—Hyperlinks via list view for quick access, 6—Add/Edit vendor relationships, add sub vendors, add pertinent information to each master/sub vendor.
8. Ability to set conditions and thresholds that trigger actions across other functions within the system and external systems.
9. Ability to receive or send data to and from other functions within the system, or external systems.

Business Function, "Reporting", (at each node, plus aggregate, summarized reporting) provides support for the functions as listed, but are not limited to:
1. Ability to generate a report at any tree node.
2. The inventive system provides reports with various levels of detail. The user has the ability to customize the format and content of reports.
3. Summarized reports of statistical information such as dashboards and collective summaries of past, current and planned executions, historical analysis and future trends are available for high level/executive management.
4. The inventive system provides real time and batch reporting of lifecycle flow of items, their related activities including progress and status of approvals and execution.

Assist Function, "Look Ahead", provides support for the functions as listed, but are not limited to:
1. Ability to generate a report and additional summary status at any tree node that provides a list of current and outstanding activities within a period specified and selected, such as End of This Week, End of Next Week, End of the Month, etc. as well as any date in time through user selection.
2. Ability to access any activity dynamically from the information that is displayed on the User Interface.
3. Workflows enable interactive collaboration and updates to the selected nodes and their attributes.
4. Ability to set conditions and thresholds that trigger actions across other functions within the system and external systems.
5. Ability to receive or send data to and from other functions within the system, or external systems.

Assist Function, "Business Considerations" interlinking, provides support for the functions as listed, but are not limited to:
1. Ability to create a hierarchical structure of business considerations independently at any tree node with an unlimited number of nesting layers. Multiple ITEM entries can be added to each consideration layer. Each ITEM entity contains profile information pertaining to a specific, grouped collection of business considerations as specified by the user. The user can assign priority, severity, importance, due dates, progress status, update status, history and attachments. Examples of business considerations include special security provisions, pertinent compliance requirements, etc.
2. Invoke linking the Business Consideration function from any node to selectively inter-link existing Business Consideration Items from any source.
3. Workflows enable management of the lifecycle and interactive collaboration.
4. Can be invoked anytime a business consideration must be observed or adhered to and dealt with at the activity pertaining to any node of the tree (from highest to lowest node).
5. UI functions: 1—List all defined business considerations of a selected tree node, 2—View summary information of all linked considerations, 3—Add new business considerations, 4—Ability to Display/Edit/Delete an existing business consideration 5—Ability to select a new node from the program structure tree, 6—Ability to invoke any other assist or feature function from the tree, 7—Ability to invoke function short cuts and hyperlinks.
  6. Ability to flip-flop between the linked Business Considerations and the invoking node.
  7. Ability to set conditions and thresholds that trigger actions across other functions within the system and external systems.

Assist Function, "Cross-Node Dependency" interlinking, provides support for the functions as listed, but are not limited to:
  1. Ability to define a dependency between any two nodes of the tree within the scope of a single program or between nodes from two different programs. The user can select from several types of dependencies, such as pre-requisite, post-requisite, reference, etc.
  2. Ability to traverse and graphically display a dependency chain.
  3. Ability to click the Dependency field on the List View of a source node, which is involved in a dependency relationship, to directly display the target node.
  4. Ability to monitor the effect of dependencies on the time schedule of nodes (projects, activities, and tasks) and proactively issue warnings in case the dependency and the time schedule violate one another.
  5. UI functions: 1—List all dependencies of a selected tree node, 2—View summary information of the dependencies, 3—Add a new dependency, 4—Ability to Display/Edit/Delete an existing dependency 5—Ability to select a new node from the program structure tree, 6—Ability to invoke any other assist or feature function from the tree, 7—Ability to invoke function short cuts and hyperlinks.
  6. Ability to flip-flop between the linked the paired dependent nodes.
  7. Ability to set conditions and thresholds that trigger actions across other functions within the system and external systems.

Assist Function, "Cross-Node or Function" interlinking, provides support for the functions as listed, but are not limited to:
  1. Ability to define a link or hyperlink between any two nodes of the tree within the scope of a single program or between nodes from two different programs.
  2. These links act as hyperlinks or shortcuts and allow the user to navigate from linked nodes directly.
  3. Ability to flip-flop between the linked the paired nodes.
  4. Ability to set conditions and thresholds that trigger actions across other functions within the system and external systems.
  5. This function is embedded within the different functions of the hierarchy structure and across other Business and Assist Functions as applicable.

Assist Function, "Action Item", provides support for the functions as listed, but are not limited to:
  1. Ability to create a nested structure to manage, assign and track one or more action items.
  2. Accessible at any node of the tree (from highest to lowest node) and within the context of any assist or feature function.
  3. UI functions: 1—List all action items of a selected source node, 2—View summary information of all nested nodes, 3—Add new action items, 4—Ability to Display/Edit/Delete an existing action item, 5—Select any source node from the tree, 6—Ability to invoke any other assist or feature function from the tree (right-hand-click button), 7—Ability to invoke function short cuts and hyperlinks.
  4. Workflows enable management of the lifecycle of the action items through interactive collaboration.
  5. Ability to set conditions and thresholds that trigger actions across other functions within the system and external systems.

Assist Function, "Approval Management", provides support for the functions as listed, but are not limited to:
  1. Ability to create a nested structure to initiate requests for approval to one or more approving persons, with the ability to specify primary and secondary approvers
  2. Workflow capability to manage end-to-end lifecycle of approval requests with progress monitoring and status reporting, and other operations through interactive collaboration
  3. Can be invoked anytime an approval is required at any node of the tree (from highest to lowest node) and within the context of any feature or assist function
  4. UI functions: 1—List all existing approvals of a selected tree node, 2—View summary information of approvals in the List View, 3—Add a new approval workflow, 4—Add multiple approvers to a selected approval workflow, 5—Ability to then display a newly added approval workflow, 6—Ability to select a new node from the program structure tree, 7—Ability to invoke any other assist or feature function from the tree (right-hand-click button), 8—Ability to invoke function short cuts and hyperlinks.
  5. Ability to set conditions and thresholds that trigger actions across other functions within the system and external systems.

Assist Function, "Meeting Management", provides support for the functions as listed, but are not limited to:
  1. Ability to define/schedule meetings in a nested structure with children recurrences and specify the information needed for the meeting (e.g., date and time, venue, physical address/phone number/URL, list of invitees, requestor/host, purpose, proposed agenda if any, recurring or not, etc.)
  2. Ability to define and record the outcome of each meeting occurrence with actual information (e.g., actual date and time, venue, physical address/phone number/URL, list of attendees, host, agenda, meeting minutes, action items, etc.)
  3. Can be invoked anytime a meeting is needed at any node of the tree (from highest to lowest node) and within the context of any feature or assist function
  4. UI functions: 1—List all defined meetings and their corresponding occurrences of a selected tree node, 2—View summary information of meetings and meeting occurrences in the List View, 3—Add a new meeting, 4—Add a new meeting occurrence to an existing meeting, 5—Ability to Display/Edit/Delete an existing meeting or meeting occurrence, 6—Ability to select a new node from the program structure tree, 7—Ability to invoke any other assist or feature function from the tree (e.g., attachment of documents pertaining to a meeting or meeting occurrence), 8—Ability to invoke function short cuts and hyperlinks.
  5. Workflows enable management of the lifecycle and interactive collaboration
  6. Ability to set conditions and thresholds that trigger actions across other functions within the system and external systems.

Assist Function, "Attachment Management", provides support for the functions as listed, but are not limited to:
1. Ability to attach one or more documents of any content, which are identified by their pathnames and other file system information, to a tree node or a function of the inventive system
2. Accessible at any node of the tree (from highest to lowest node) and within the context of any assist or feature function
3. UI functions: 1—List all attachments for a selected node from tree, 2—View summary information of all attachments associated with the source node via List View pane, 3—Add new attachments on the lower detail pane, 4—Ability to Display/Edit/Delete an existing attachment, 5—Select any other node from the tree, 6—Ability to invoke any other assist or feature function from the tree, 7—Ability to invoke function short cuts and hyperlinks.
4. Workflows enable management of the lifecycle and interactive collaboration.
5. Ability to flip-flop between the linked node and attachments
6. Ability to set conditions and thresholds that trigger actions across other functions within the system and external systems.

"Compliance Governance" is a collection of Business and Assist Functions that provide functions as listed, but are not limited to:
1. The inventive system enables end-to-end management of compliance, auditing and accountability of government and regulatory requirements.
2. Assist/support Functions, including business considerations, cross-activities interdependencies, approval management, document management, meeting management, and historical data availability are utilized in a centralized or localized mode at any activity node irrespective of its position in the hierarchy of the program to enable effortless real-time accessibility to pertinent evidence information.
3. Business Functions that include Resource Capacity Management, Asset Tracker and Scheduler, Vendor Management etc. provide additional support to managing governance of each activity at its source, and enable speedy access and recovery of information and data.
4. Additionally, the supportive functions enable compliance related requirements to be easily visible for accurate executions by the users who must observe and comply with the requirements.
5. Because of our interlinking method, the compliance related requirements that are referred to as Business Considerations that are accessed during the execution time are 100% accurate as of their last update, eliminating the use of obsolete/redundant/old information.

Management of extremely large programs that comprises of a nested hierarchy of mega-projects and projects that can span multiple logical and geographic partitions.

Nested structure with capabilities above project-level enables corporations to manage their organization activities from Parent Company-Subsidiaries-Divisions-Departments-Teams, Initiatives hierarchy, and with the flexibility of initiatives that can be associated to any level of the hierarchy, with the real-time ability to step-up at each level that provides a summary of the children nodes, or step-down to next level that provides a breakdown information of the children nodes.

Our method enables quick access to all levels of major functionality, supporting/assisting functions, statistical, quantification and graphical data/reports pertaining to each level of activity and its progress status.

Cross-referencing activities across megaproject cross-relationship between megaprojects for dependencies and implementation considerations.

Embodiment of standard or non-standard methodologies into our workflow. The methodology folder enables the creation of various types of approaches and methodologies deployed to drive a program/project through various phases of development and implementation lifecycles such as initiation, planning approving, analysis, design, construct/develop, test and deploy into production, including post production support. Any defined methodology can be used by any program/project structure to manage its lifecycle.

Risk, Importance and Complexity based management of activities including scheduling and reporting.

Ability to override automatically derived aggregated values and data giving more flexibility and control to users according to their security privileges or management level Our invention uses our developed logic to enable progress tracking of any activity, nested activity (or nodes), assist/support functions pertaining to the activity or major feature/function. Our cross-dimensional logic between duration of the activity and percentage complete at any given time in relation to current date derives and displays current state in terms of textual verbiage, colored flagging, and graphical depiction of any activity at any level of the hierarchical structure of the program.

Proactive displays, alerts and notifications of approaching due dates in accordance to the progress thus far relative to defined duration, risk, importance and complexity of the task. Integration of seamless end-to-end governance management and the management of complex business projects and processes Our invention enables user to assign manually, or use logically computed value of the weight to any node/activity. The weight value, or factor selected by the user then is taken into account during the aggregation and averaging of that node against other nodes, and the summarized details represent value with the weight factor taken into account. This weight factor can amongst many other things, change the percentage complete value of a node to be reduced, maintained as is, or increased from its entered numerical value. This technique allows low-level activity/tasks to be appropriately represented in the averaging calculations versus straight average other techniques, including Microsoft Project, do.

Spherical information viewing, universal accessibility, control/coordination/collaboration and ease of entering data.

Each UI pane works independently of the other; that is, any one of them can be invoked to change while others can remain unchanged. The system also has the ability to present information in past, present and future format via the combination of the panels.

Simplification of all major aspects of tracking, reporting and securing of information at the source for all levels of skill sets, from lowest level of individuals who can be non-technical or technical, to the top management and executive level involving CIOs, CFOs, CEO's etc.

Our system allows propagation of the current state of any activity from the lowest node of the hierarchical program structure to the highest owning node of the program. The logic involves various types of start, end, due and current dates (such as estimate, committed, actual, forecast etc.), importance and risks in terms of impact to service or business, priority, severity and other information. The current state information includes percentage complete of each activity/node and the values of parallel nodes (meaning immediate nodes/activities under any one parent node) are aggregated, and the average of parallel nodes is then associated and displayed at the owning parent node. Similarly, the status flags, textual verbiage and graphical inter-linking displays are also aggregated, linked and associated to the parent node, which in turn displays a summarized version of its immediate subordinate nodes. This step-up computed propagation of details enable automated, hands-free and real time propagation of summarized information at the each parent node, allowing total visibility into any aspect, level or stage of activity for management, tracking, monitoring and reporting, and allow user to take swift actions to mitigate deadline delays, budget overruns and other issues and risks. Further, each node/activity allows user to override the computed data (percentage, flag, verbiage etc.) with a user-selected value, which in turn could be used in aggregating and averaging the summarization of the node.

Resident application that will control at ease every related activity, budgeting, resourcing, risk and issue management, people-on call tracking, compliance etc as relates to individual activities, critical path tracking etc.

Our invention enables the recording and tracking of estimated, forecasted and actual workload (in hours, days, months etc.) against each resource (could be a person, tangible or non-tangible item such as a service) across each activity. These are tracked at any feature, function or activity that includes nodes within a program, issue, risk tracking, action item, meeting, budget, reporting, vendor management, etc. This enables resource billing for each activity against the appropriate project (or according to other criteria). Additionally, the estimated, forecast vs. actual time tracking allows for historical analysis and future forecasting.

Our invention allows speedy access to any activity/node level reporting of summarized details and searching for any level of details within our system. This search enables access to activity/node cross-referencing attachments, progress status, final outcome and other pertaining details. Further, the inventive system tracks 'last update' details of each node/activity for reporting and other purposes.

Our invention enables management of any node's supporting/assist activities such as approval, action items, meetings management, outstanding tasks, inter-node/activity dependencies, inter-node/activity considerations and requirements, attachments etc. Each function's current state is depicted via a combination of logic that include the date/time of requested, due/end, current, actual completed, forecast etc., the quantity of activity completed in terms of percentage, or progress status value ('requested', 'processing', 'approved', 'on hold', 'declined' etc.). A summarized value representing each combination of logic in terms of numerical, verbiage, graphical and other means is then associated to that activity/node and displayed for progress status, reporting purposes.

Our invention allows a 'view or look ahead' ability at any activity/node and displays in a summary format all information pertaining to a selected node's nested nodes/activities, such as outstanding activities, completed and other criteria for any specific period of time that include today, end of week, end of 1-week, 3-week, month, quarter, six month, year etc.

Our invention enables complete end-to-end charting of all activities within a program and associated other program nodes, start/end dates, progress status and inter-dependent criteria (pre-requisites, post-requisites, reference, documentation etc.) via graphical, textual, statistical, and other forms. This enables users to obtain at-a-glance information pertaining to inter-dependent nodes, their current real time status and their impact to the source node. Further, our invention allows quick cross-functional interlinking and access of dependent nodes from source node and vice versa.

For Business Considerations and Dependencies, the user interface of the inventive system is unique in the way it allows for a nested structure/tree from which mass considerations or dependency nodes can be selected within one single UI view Ability to track lifecycle of objects or items within a hierarchy of nested activities with respect to timeline. Example is the highest node (mega-program) is manufacturing cars in different locations, below this node we have several plants (program) at each location worldwide. Under each plant, we have several models (project) nodes. For each model, we track its activities such as planning, designing, manufacturing, assembling, testing, shipping etc. (activity groups). We support tracking of sub-activities and tasks at each activity for each item.

The system enables the definition and tracking of a complete lifecycle of individual items within the hierarchy of activities. In the car manufacturing example, the items are wheels, engines, dashboards, chassis etc. The system will track and manage start to end sets of activities that each item is subjected to, through time.

The system has built in scheduling and calendaring function to allow each item to be scheduled against a user-defined maximum capacity across a day, week, month, year etc. and through computation, tracks and displays the utilized (that is, already scheduled) capacity and the available (that is, remaining) capacity.

Scheduling of activities for items allows for chronological sequencing of activities, tracking of status and progress, and approvals. Sequencing of activities allows pre and post requisite dependencies to ensure that certain activities are executed in the proper order (bolts secured before the engine is mounted).

The system additionally enables archiving and tracking of data that can be used for record retention purposes. The system's structure and inbuilt functions enable creation of categories, define conditions and thresholds to notify and/or delete data, provide approval tracking capability, and the ability to restore archived data when requested. All actions, requests and operations are traceable and reproducible for audit or verification purposes.

Finally, the system provides real time reporting of lifecycle flow of items, their related activities including progress and status of approvals and execution. The system also provides high level management type of statistical information such as dashboards and collective summaries of past, current and planned executions, historical analysis and future trends.

All these tracking as all the features have the compliance and regulatory support for managing complete governance around it. All features are applicable and accessible for use at each and every level of tracking that occurs for all activities and items in the system.

DESCRIPTION OF AN EMBODIMENT OF THE INVENTION WITH REFERENCE TO THE DRAWINGS

FIGS. 1 through 21 are just some of the many options that can be deployed to implement the methods and systems of the present invention. In addition, the methods can adapt any public-domain available or other commercially-available industry-standard approaches. The methods can be integrated with methods, systems and/or applications supplied by third-party vendors or developed and built within organizations.

FIG. 1 describes the method to create a variety of structures that enable tracking and flow of flow of information between parent nodes and nested children nodes within a hierarchy. The nodes 101 can be organized in a hierarchy, and new sub-nodes or parallel nodes can be added to any node. Each node performs an activity that caters to the organization or the related role/user's requirements. The example illustrates managing a large corporation from the top parent company 102 perspective, broken down into subsidiaries 103, divisions within each subsidiary 104, departments or mega programs 105 within each division, teams or programs 106 within each department or mega program, initiatives or projects 107 within each team or program, and subsequently, activities, sub-activities, tasks, sub-tasks 108 etc. within each initiative or project. The structure can be applied to manage any type of operation, with the user having the ability to name the nodes anything. The highest level of hierarchy, the parent company 102 is equivalent to the Root node 203 in FIG. 2. The method supports any number of nodes from the project node 107 level upwards, such as illustrated by three Tier 110, two Tier 111 and one Tier 112 structures, all of which can co-exist in the overall organization hierarchy. At any level, the method allows the ability to track and combine different types of nodes. In other words, a Program node may include a combination of Project, Activity and Task-level nodes. The information entered at the lowest node, say, sub-task 108 gets aggregated with its subordinate (i.e., parallel) nodes, providing a resulting percentage value to its immediate parent node that is either averaged or computed through a system or user-defined algorithm, including weighting. Similarly, the flag indicator values, such as Green, Yellow, Orange, Red or Flashing Red, gets aggregated through the system or user-defined Boolean logic, and the resulting color is assigned to its parent node. The information flows between any two levels of nodes in a step-up or step-down 109 approach. The step-up approach enables the information to be summarized as it flows up, while the step-down approach provides additional granularity of information as pertains to the children nodes. The method enables a user to access any node in the hierarchy to view its and its children nodes' pertinent information that is facilitated by many Graphical User Interface (GUI) panes in FIG. 2. Each node allows creation and tracking of Business Consideration items in a nested mode, allowing details to be entered, attachments to be uploaded and workflows and triggers assigned. Each item from any node is dynamically linkable to any node in the organization, enabling the invoking node to access the linked Business Consideration item 113 information and attachments real-time. Any node in the organization can invoke Dependency inter-linking 114 of any other node in the hierarchy organization, and the linked target and source nodes will have the cross-referencing information of each other. The overall structure enables real-time interactive collaboration amongst many human and non-human engagements. Each node enables the display, access, control and monitoring of the information as per the role assigned in the hierarchy. In the illustration, individuals with different roles and titles 115 have access to different level of nodes, with the higher level role having access to some or all of the lower nodes, according to the security access set.

Figure 2:
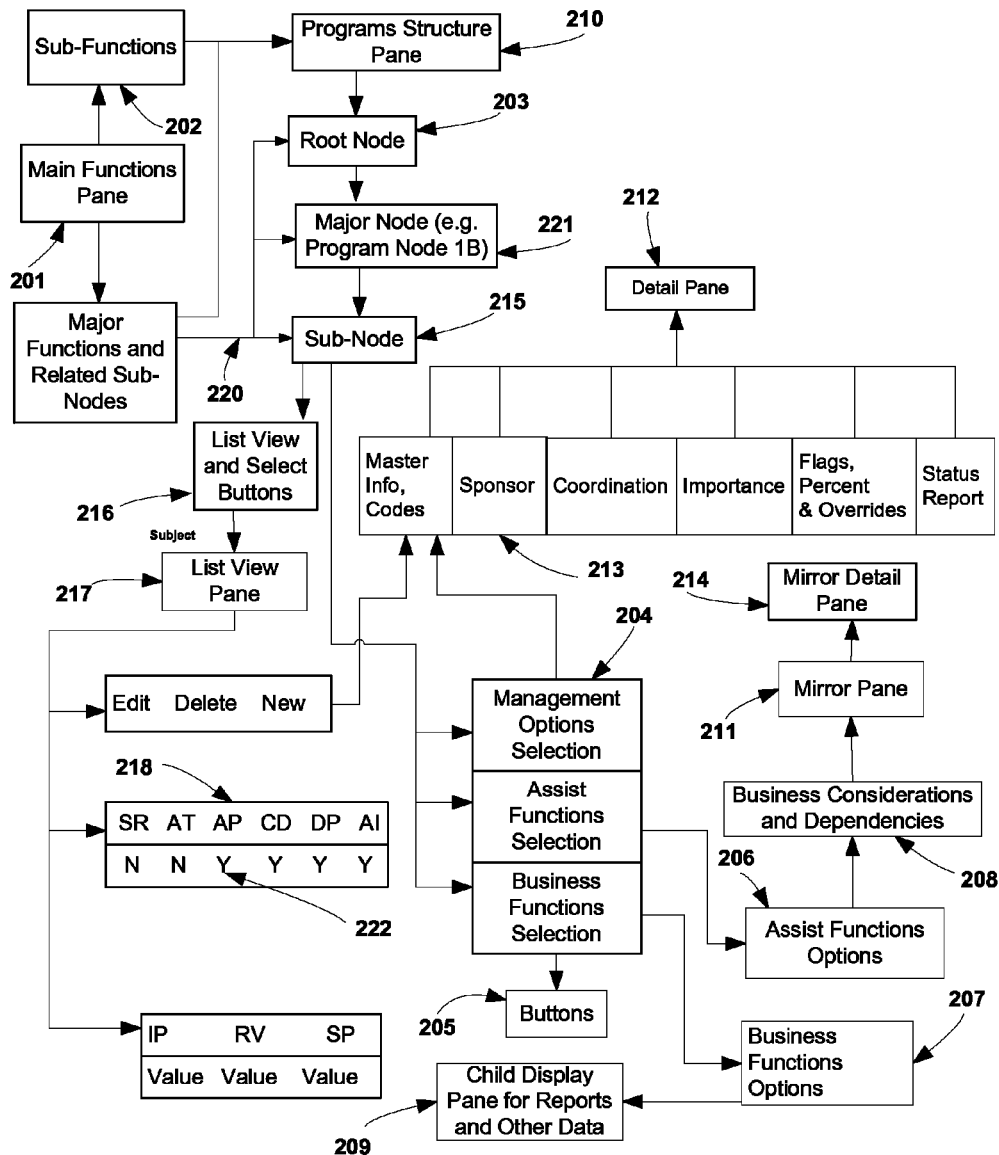
FIG. 2 illustrates an embodiment of the invention to enable the panes in a Graphical User Interface the ability to organize, access, display and monitor functions and their pertinent information.

FIG. 2 describes a method to access, create, maintain and display information related to the functions available in the system. The User Interface contains many display panes, each organizing the information in the context of relevancy and segment by category or grouping of the related information. Panes can be resized, shuffled, closed or hidden. The navigation buttons and access points of these panes can be invoked from multiple points, including from each node in the Programs Structure (Node Tree Hierarchy) pane, a centralized point, etc. Each pane enable management of a part of a function through right hand button click 202, 203, 204, 205, 206, 207, 208, 209, select buttons 216 or other means. The accessed panes provide information that is tracked at the invoking node 204, 215. This allows for a speedy access to any function and its related content that is pertinent (i.e., localized) to the invoking node. The Main Functions pane 201 displays and provides access to the major functions 220 that are expandable to access their sub-functions 202. The functions enable access to the information from all the nodes in the system for a selected function, including the cross-referencing owning nodes, to provide a consolidated centralized view. Each function also enables the ability to store pages and most accessed functions, as a quick navigation launch. The Programs Structure (i.e., the Node Tree Hierarchy) pane 210 displays each created structure of nodes 221 and sub-nodes 220, with each node allowing access to available functions 204. Double-clicking on a node 202, 220 or other means allow the lower level sub-nodes expanded in the same pane, and invocation of the List View pane 217 that display pertinent information, and enables creation/modification/deletion and other operational actions. Every displayed field in the List View pane (No, Name, Duration Flag, SR (for Status Report), AT (for Attachments), AP (for Approvals), CD (for Business Considerations), DP (for Dependent Nodes), AI (for Action Items), IP (for Importance), RV (for Risk Value), SP (for Set Priority), Progress Status etc.) display hyper-linked values so that selecting a value launches access to its pertinent information. For example, selecting Y 222 under AP for a node Program Node 1B launches the Approval Workflow pane that enable access and display of the Approval workflows localized to that node, with its relevant summary, status, update ability etc. Each node displayed in the List View enables access to its immediate sub-nodes whose information is also displayed below the selected node. The Detail pane 212 such as accessed from List View 216 or right click button 205 contain all the data fields that can be modified in this pane, with information grouped in tabs 213. The Mirror pane 211 enables access to the existing node structure 210 but with the ability to select the individual target nodes and sub-nodes, which when selected are inserted in the Mirror Detail pane 214. This allows the ability to execute functions such as Business Considerations and Dependencies 208. The Mirror Detail pane enable the ability to associate attributes such as pre, post-requisite relationships, and the ability to formalize the interlink relationship between the invoking node and the target dependent nodes, whose summary information is then displayed in the List View immediately, and any time the function is selected from the menu 208 or through the hyperlink value 218. Conversely, the invoking node's information and relationship is displayed at the target nodes. Graphical representations for reports are displayable as a child pane 209 or through full screen Report pane. Every node provides access to the menu 204 that provides easy access to both the supporting functions called the Assist Function 206 and the major functions, called the Business Functions 207. Each function's information, data, workflows, reports etc. that is entered and tracked are localized to the invoking node, and accessible as per the illustrations mentioned above. Selecting the Root node 203 displays the highest level of mega nodes in the List View and their pertinent information.

Figure 3:
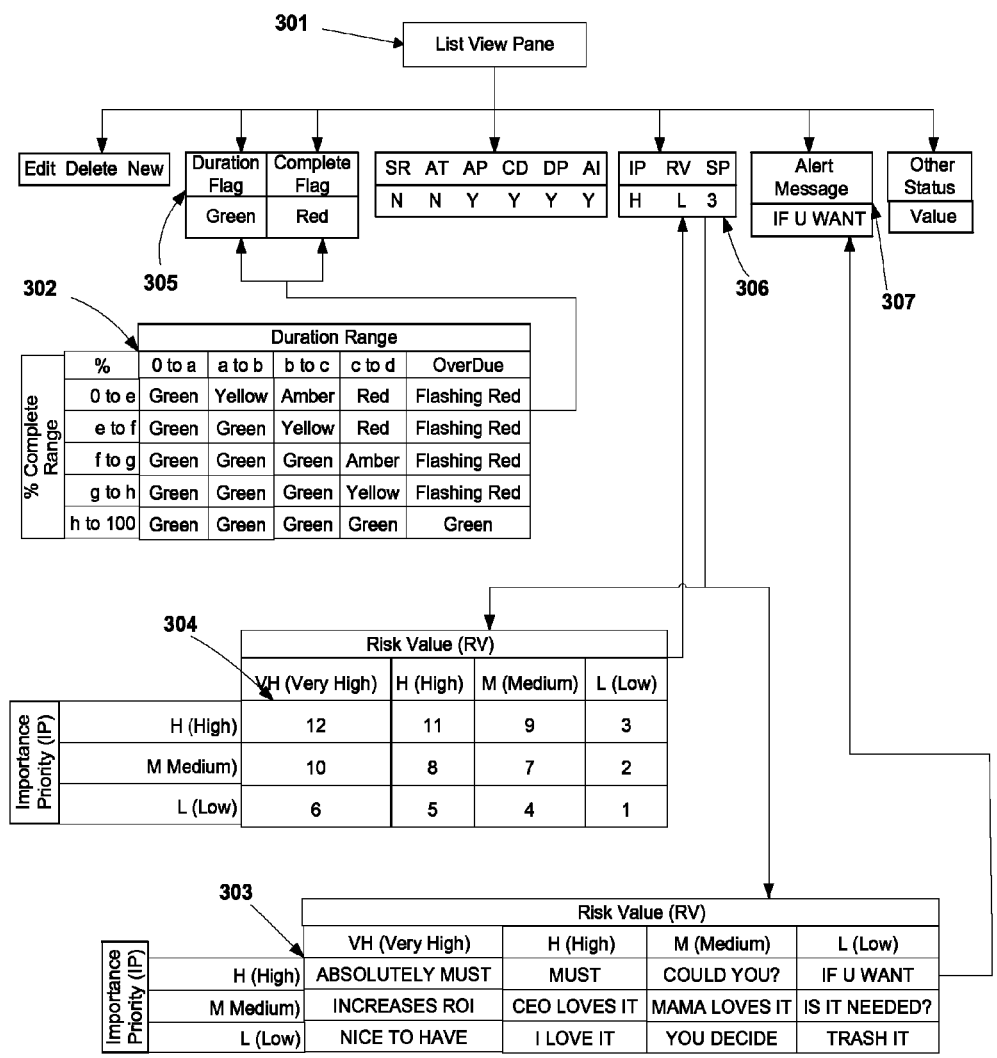
FIG. 3 illustrates an embodiment of the invention to enable users/systems/processes to define input labels, criteria, and resultant values for warning flags and progress indicators.

FIG. 3 describes a method defining the warning color of the indicators for an activity progress and alert messages that communicated outwards for any said node in the hierarchy. The values established in this multi-dimensional array are then propagated programmatically to be displayed in the List View pane 301. User input or method-defined algorithms are applied for the two dimensions, Completion Range and Duration parameters in the 302 table, and the cross-referencing cells. Depending on the actual progression of the activity with respect to the duration gone, the color in the cell is programmatically associated with that node and displayed in the Duration and Complete Flag fields 305 in the List View pane for that node. As time runs out and the progress is slow, the colors change, intensifying the urgency to take actions, thus enabling proactive management of risks. The method enables user to define the labels and values for Importance Priority (IP), Risk Value (RV), and their corresponding cross-referencing cell values or text in the tables 303, 304. Fields IP and RV 303 also appear in the Detail pane of every node, allowing a user to select the value from the drop-down selection box. The combination of the IP and RV values selected then invokes the appropriate cell value in the List View pane for SP (Set Priority) 306 and Alert Message 307, for the related node. When many children (that is, parallel) nodes exists, the SP and Alert Message values assist in prioritizing which node should be handled at higher priority. Similar user-defined parameters and corresponding resultant values are computed and displayed for various warning, progress and other indicators across every Assist Function (Attachments, Action Items, Meetings, Approvals, Business Considerations, Dependencies, Look Ahead etc.) and Business Function (Timeline, Budget, Asset Scheduling, Issues, Risk, On Call, Vendor etc.). Each function is managed through its own function pane with its own List View pane display which will depict the warning values.

Figure 4:
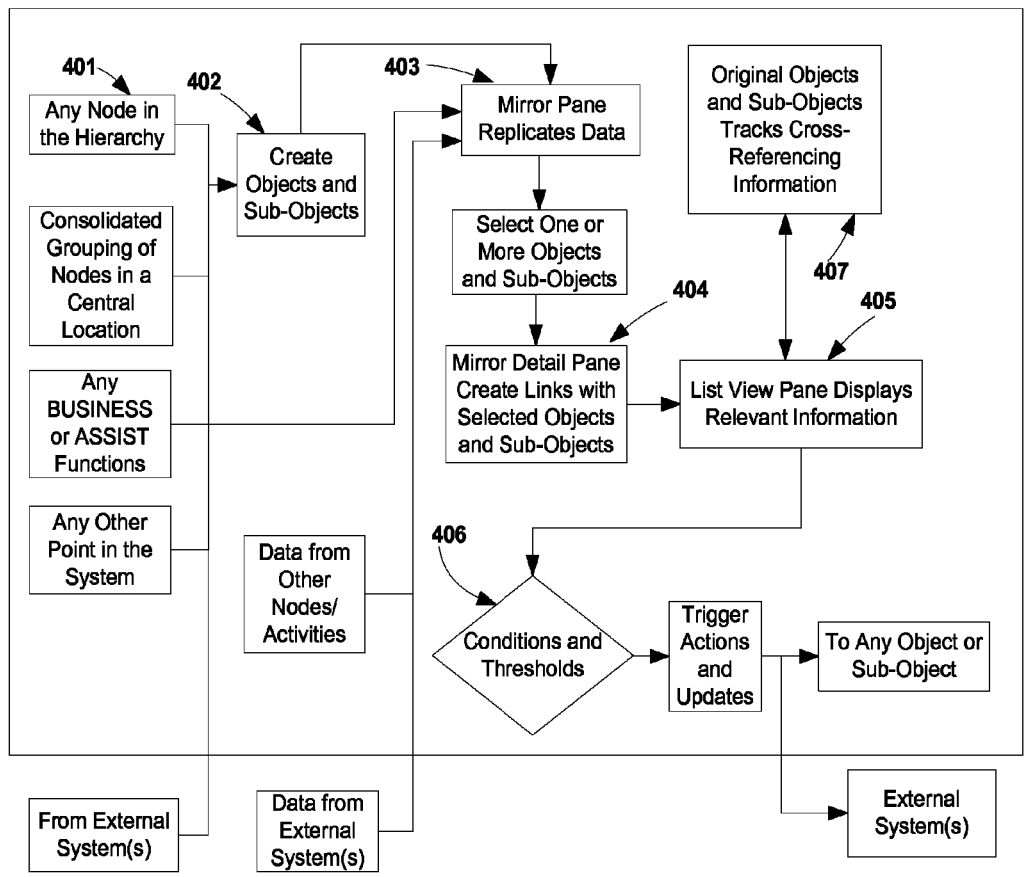
FIG. 4 illustrates an embodiment of the invention to enable creation of business considerations that are dynamically linkable to a node in the hierarchy tree.

FIG. 4 describes one such method for Business Considerations function that can be invoked from every node or any other location 401, and when linked, localizes its data to that invoking node or source for speedy retrieval and real-time oversight. Business Considerations Items (or any information) can be independently created and tracked at any node as a repository 402, with folder and sub-folder, upload documents, workflow and event-triggering capability. They can then be selectively linked to any target node as a separate operation. A smart GUI Mirror pane 403 (FIG. 2, 211) enables the display and ability to select items from the displayed repository, which upon selection are inserted in the Mirror Detail Pane 404 (FIG. 2, 214) where additional relationship attributes are applied and final submission performed. The linked Considerations Items appear in the top List View 405, displaying all their relevant summary information and attached documents real time, and enable conditional settings that trigger other actions 406. Further, the invoking node's summary display in the List View will display Y under attribute CD (for Considerations) (FIG. 2, 218), indicating a presence of Consideration Items, and selecting Y displays the real-time summary and detailed information of the linked Consideration Items, and enables creation/modification/deletion and other operational actions. Additionally, from the repository end 407, the Business Consideration items in the repository that are linked to any source node provides information on the source (invoking) nodes that are linked to each item. This is extremely of value in management and tracking of multi-tiered initiatives and nested initiatives, which require the source of information, such as requirements or business considerations reside at a different location(s) and are managed by different group of people, departments or initiatives. One such use is an Engineering company where its business department can track building regulations in different categories as Business Considerations, as applicable to their construction projects managed in the system within the structure of nodes. These regulations can then be linked to specific building activities managed by different nodes as applicable. This ensures that the most current regulations are automatically accessible at the source of the work that requires them, while the management of these regulations is performed elsewhere, improving the overall management, quality and preventing delays and budget overruns. Considerations inventory, and the linked considerations from each node can be consolidated and accessed from a centralized location. History tracking enables reproduction of information for audit and other purposes. The information is secured, downloadable and printable. Reports can be generated and posted or displayed in this function, other function in the system or in different systems.

Figure 5:
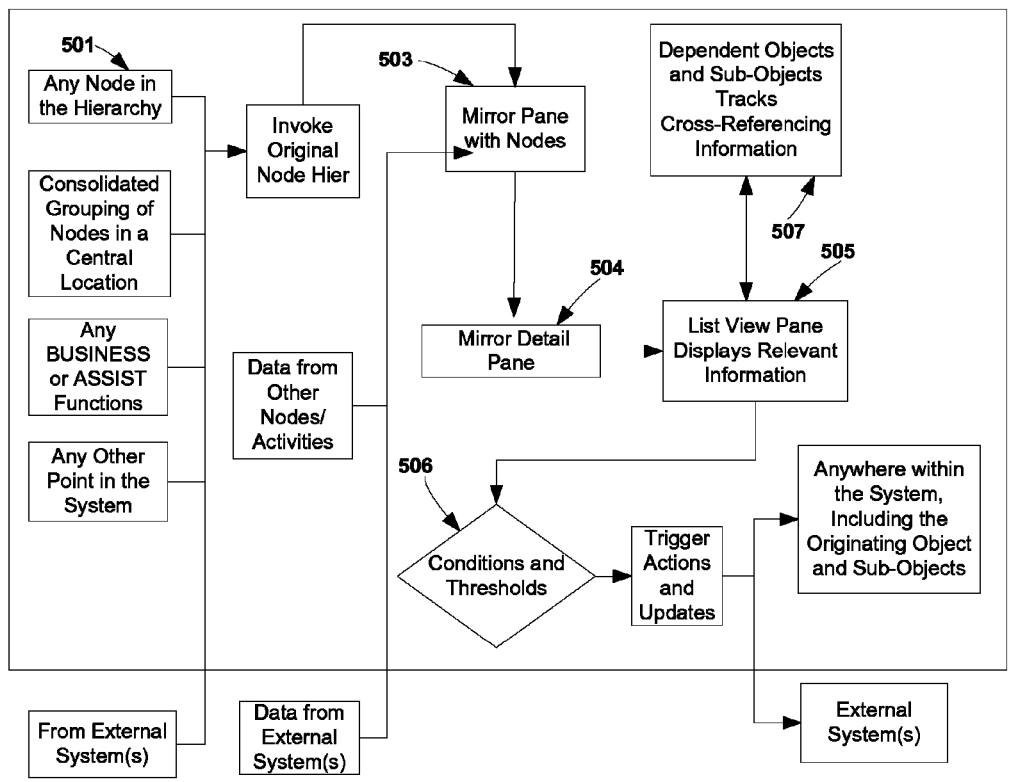
FIG. 5 illustrates an embodiment of the invention to enable inter-linking of existing nodes from any structure to another node.

FIG. 5 describes a method to interlink existing nodes to any node through the Dependencies function that can be invoked from every node 501 or any other point, and the interlinked nodes provide all their related information within the context of the invoking node, localizing the data at the source node for speedy and real-time oversight. A smart GUI Mirror pane 503 (FIG. 2, 211) enables the display and ability to select nodes from the displayed list of all the nodes in the system, which upon selection are inserted in the Mirror Detail Pane 504 (FIG. 2, 214) where additional relationship attributes (pre, post requisite, reference etc) are applied and final submission performed. The linked Dependent nodes appear in the top List View 505, displaying all their relevant summary, status, warnings and other information real-time, and enable conditional settings that trigger other actions 506. Further, the invoking node's summary display in the List View will display Y under attribute DP (for Dependencies) (FIG. 2, 218), indicating a presence of Dependent nodes, and selecting Y displays the real-time summary and detailed information of the linked dependencies, and enables creation/modification/deletion and other operational actions. Further, the target Dependent Nodes in their own business structure also display identical information of the invoking nodes at their end. The dynamic link creates a pair relation between two or more nodes, and each side is able to access the other node's information 507. The Dependent nodes can be from the same business structure or any other in the tree. Threshold and conditional settings enable triggering of actions, events, workflows and notifications. This is extremely of value in management and tracking of multi-tiered initiatives that have inter-dependencies between activities of the same project or program, or independent mega program, program, project, department, division etc. real time, so that when values of nodes on either side change, the information is propagated real-time to the related nodes, enabling real-time monitoring any attribute, such as status, warning flags, progress, change in dates, and invokes triggers to manage actions when conditions are met, and allows adjustment of dependent activities. One such example is the Legal Department tracking customer payments under a node called A6 "Client ABC Lawsuit", which is nested several layers below a main node called P1 "Legal Dept" that tracks all activities under this department. This node (A6) is linked to a node called P2 "Pay Customer Invoices" node that resides in an independent P1 "Financial Dept" node that track all the accounting related activities. The Dependencies function displays the real-time information between the two nodes localized at their specific nodes, and with appropriate triggers set, can stop, start, hold etc. posting of payments that otherwise initiate from the P2 "Pay Customer Invoices" node. This capability, when extended across all initiatives across every node, improves automated communication, tracking and reduces delays, budget overruns and issues that otherwise result from this automated visibility. Dependencies from each node can be consolidated and accessed from a centralized location. History tracking enables reproduction of information for audit and other purposes. The information is secured, downloadable and printable. Reports can be generated and posted or displayed in this function, other function in the system or in different systems.

Figure 6:
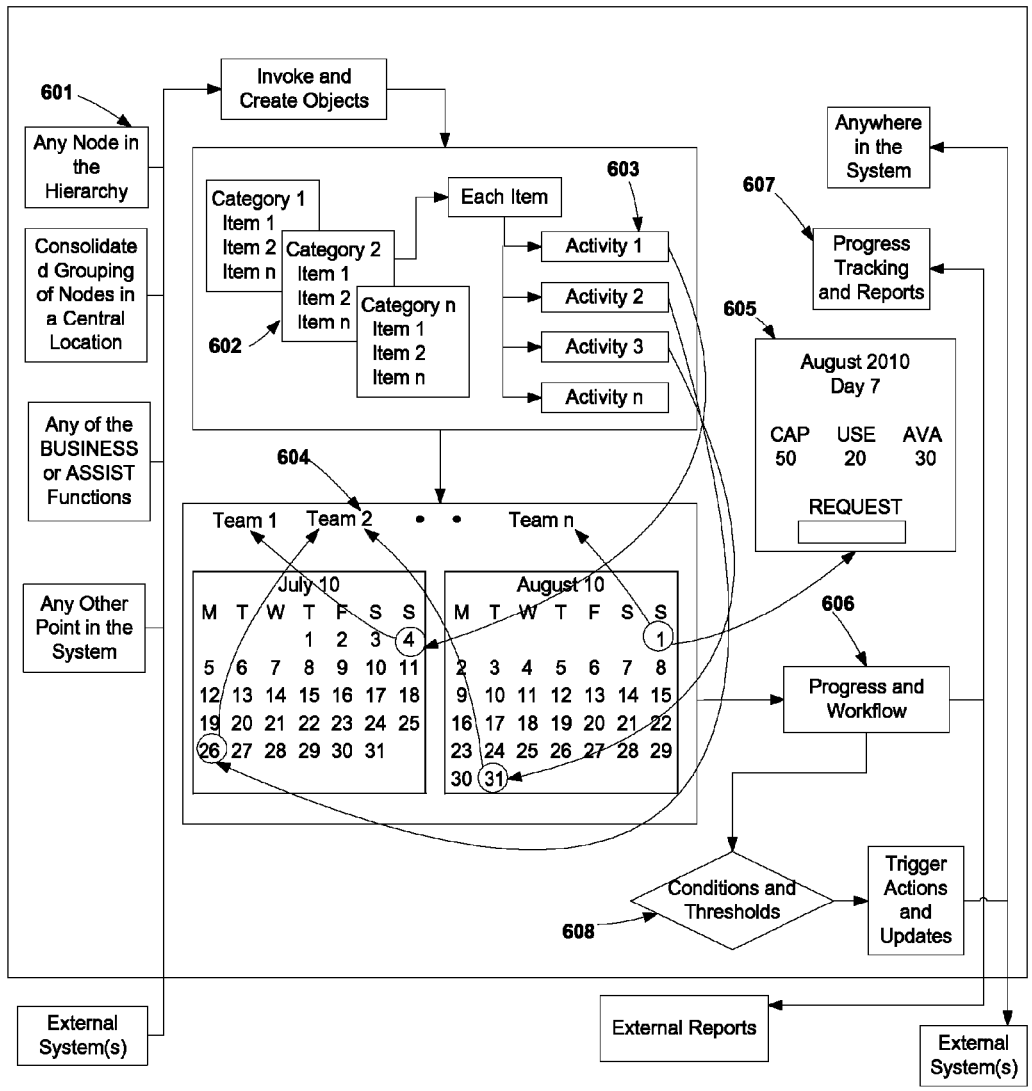
FIG. 6 illustrates an embodiment of the invention to enable each node or a source to create items in categories, create activities, link to items, schedule against teams/systems/processes and track progress.

FIG. 6 describes a method to create, maintain, display and access a structure for item inventory storing, scheduling against user defined activities against distributed teams or systems, tracking progress of each scheduled item and reporting. This function, referred to as Asset Tracker and Scheduler, can be invoked from every node 601, or any source and the function is totally localized to that invoking node, with all the relevant data available at this node. This means two different nodes invoking this function will have their own separate Asset Tracker and Scheduler capability. The function enables user to enter and track within specified categories 602 (such as AIX, Windows, Equipment Type etc.), which can track millions of items and other relational information per item. Under invoking node, a user can then define separate 603 Activities, each of which can be linked to the items in the categories. These Activities in the example are Health Check, Security Scans, Operating System Patching, Application Installation etc. The function enables creation of many working teams, denoted as Team 1, Team 2 etc. 604, each one will have its own scheduling calendar that allows the owning team or system to specify the default or maximum Capacity in the CAP field for a specified time unit such as day 605, week, month, etc. The USE (for Used) and AVA (for Availability), display the computed values as the Capacity value decreases. A user selects one or more Items from the Scheduling/Progress pane, open a selected Team's calendar (e.g. Team 1), link the Items to any day that has Availability (if AVA is non-zero). USE (increased) and AVA (reduced) fields will now display new values for future Items linking Saving the Calendar links the Items to those selected days, and in the Scheduling/Progress pane, the selected date gets programmatically linked and displayed for Team 1. Team 1 can be performing team anywhere in the world, and they now perform the necessary activity, in this case, OS Patching. The progress of each scheduled item is tracked 606 and its supporting information, tasks, progress, warning, multiple approvals, reports etc. are displayed in any display format, enabling performers, managers, clients etc. to collaborate operations, activities and tracking/reporting interactively. Real-time statistical and graphical reports are generated 607 that can be accessed from any location. The function also allows each Activity under the parent node to be sequenced to enable Items to complete their pre-requisite Activities first. This function enables any business, operational work that includes construction, assembly, logistics movement, supply chain, maintenance, servicing etc. One such example is building Personal Computers (PCs). Each PC is tracked under its own categories, say, Laptop, Desktop etc. in Items List of a parent node called PC Building. Activities defined are Order Parts, Install Components, Test Components, Package and Distribute. Each unit listed in the Items List can be linked to one or all Activities. For Each Activity, different performing teams' calendars are established, and each Item (a PC) is scheduled (say in sequence) against each Activity against each Team. Progress is tracked and the PC's work gets moved in a chain sequence from one Activity to another Activity, all the way to the last Activity, Distribute, which sends the built PC to the requested location. The Asset Tracker and Scheduler function enables multiple workflows to tie together, sequence them, and automate related activities, progress and reporting, while enabling governed control over the capacity of each performing team to ensure work is not overbooked. The List View provides summary information for all the Activities and workflows for each Item that include progress status, due dates, warning flags, approvals etc. and enables creation/modification/deletion and other operational actions. The system enables sorting and filtering capability, and enables owners of each Activity to view their items and workflows by any category or attribute. Thresholds and conditions 608 are supported that trigger actions and notifications. Updates to the invoked workflows can be initiated from other email systems, mobile and other devices. Functions from Assist Functions and Business Functions menus are accessible and usable in this function, with the relevant information tracked and localized at the source where they are invoked from. Asset Scheduling and Tracking information from each node is consolidated and accessible from a central location. History is maintained for audit or other purposes. The information is secured, downloadable and printable. Reports can be generated and posted or displayed in this function, other function in the system or in different systems. Most companies lack an automated means to handle these complex inventory, multiple Activity management, multiple Team assigning, controlled capacity tracking, and real-time monitoring of the progress and reports of these multiple activities. This function provides a universal solution to different industries, enabling the function to be localized to any node of the initiative, in turn providing a capability of private asset-scheduling function at each node, and eliminates the manual and disparate systems that are currently utilized to manage these complex scenarios that result in error-prone outcomes, reports and very costly collaboration that culminate into delays, budget overruns and reduced quality.

Figure 7:
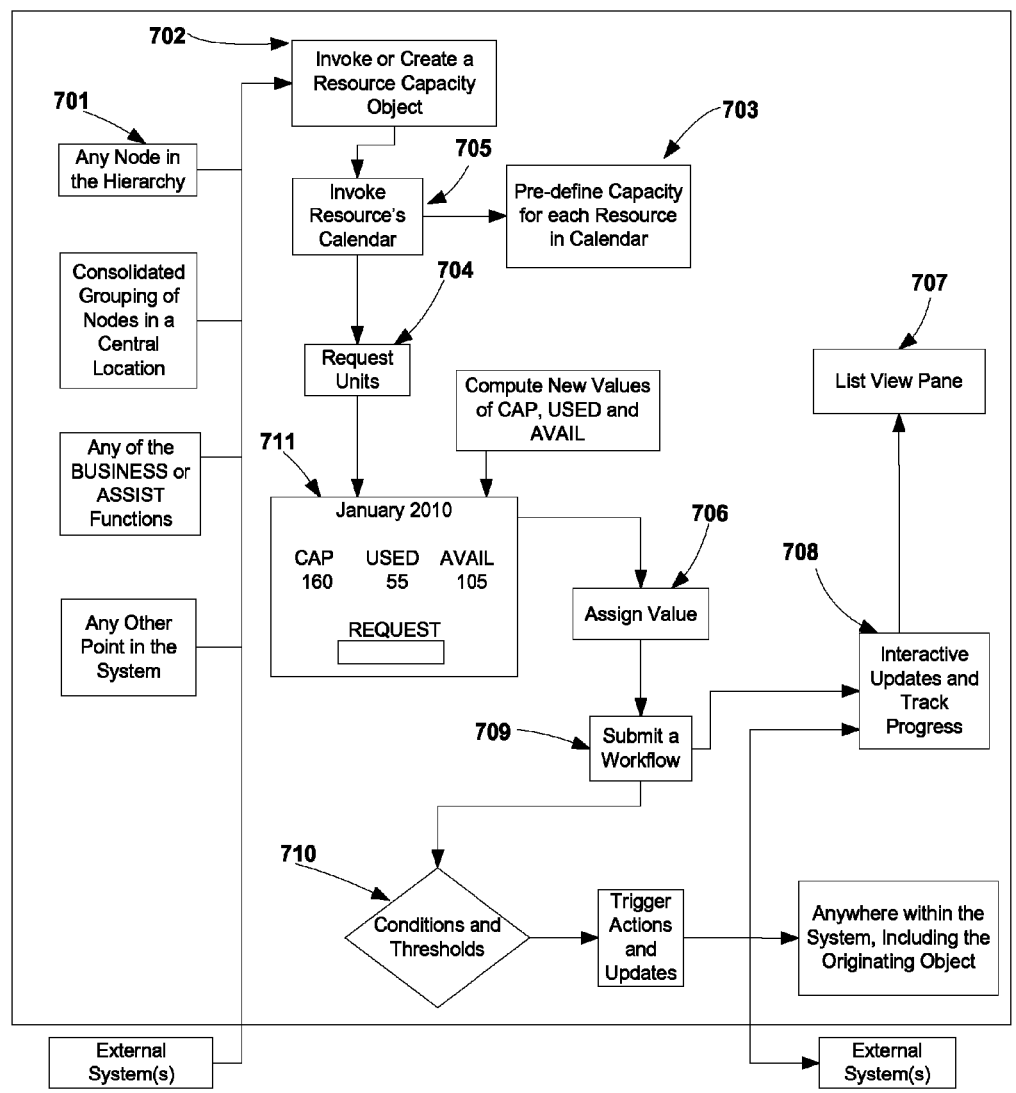
FIG. 7 illustrates an embodiment of the invention to enable each node or a source to create items, allocate capacity units against a calendar or a time system and invoke collaborative workflow.

FIG. 7 describes a method to create, maintain, display and access a structure for Capacity Management function that can be invoked from every node or a source, and the information is localized at invoking node 701 or source. The Capacity Management function enables people or system to request 702 resources that could be people, equipment, services or any logical or physical entity by creating a Capacity Item, tracks each Item's availability and assignment through the system's inbuilt calendar 705 or other means, and enables the requestor and the resource owner to collaborate the assignment of the units of the resource through a workflow process. Each Item's workflow comprises of a calendar that allows a user or system to set the maximum capacity of units 703,711 (for example a number) for each time period that could be a day, week, month, quarter, year etc. The workflow enables the requestor to request the number of units 704 required through the calendar 705, in relation to the maximum Capacity units (Called CAP), the Available units (called AVAIL) and the already Used units (called USED). The system programmatically calculates the remaining balance once a new value is requested. The Item's workflow then enables the requestor to add/update 706 the supporting information to the Item, and ability to submit the request to the resource management owner who or it can then provide responses 709 (Approved, Declined, On Hold etc.) that get recorded, tracked and reported and reproduced. The progress of the workflow, warning flags and other summary information displayed on the List View pane 707 of the function that provides interactive updating and enables creation/modification/deletion and other operational actions. The method enables interactive collaboration of information to the Item from any user or system 708. The values in the calendar are pre-defined and can vary from one time-period to another. Each Item is linked to the invoking node or source and is easily accessible directly from that location or other centralized locations. The system enables sorting and filtering capability, and enables resource owners, requestors and others to generate views by any Item or attribute. Thresholds and conditions 710 are supported that trigger actions and notifications. Updates to the invoked workflows can be initiated from other email systems, mobile and other devices. Functions from Assist Functions and Business Functions menus are accessible and usable in this function, with the relevant information tracked and localized at the source where they are invoked from. Capacity Management information from each node is consolidated and accessible from a central location. History is maintained for audit or other purposes. The information is secured, downloadable and printable. Reports can be generated and posted or displayed in this function, other function in the system or in different systems. Most companies lack an automated means to handle the capacity management of individual initiatives or departments and instead use manual means (spreadsheet, Word etc.) to track and report the information that is error-prone and incurs huge cost in performing the work and manually collaborating with resource owners. This Capacity Management function eliminates ambiguities, reduces costs, provides real-time information to the initiative owners and the resource owners, and prevents overbooking of resources, preventing delays and budget overruns. Reports and views enable information to be categorized and filtered by resources only, nodes only, all resources assigned units per node, each resource's assigned units across multiple nodes, any many other variations. This allows the requestor, the resource owner and the resource itself to obtain information from each of their perspective.

Figure 8:
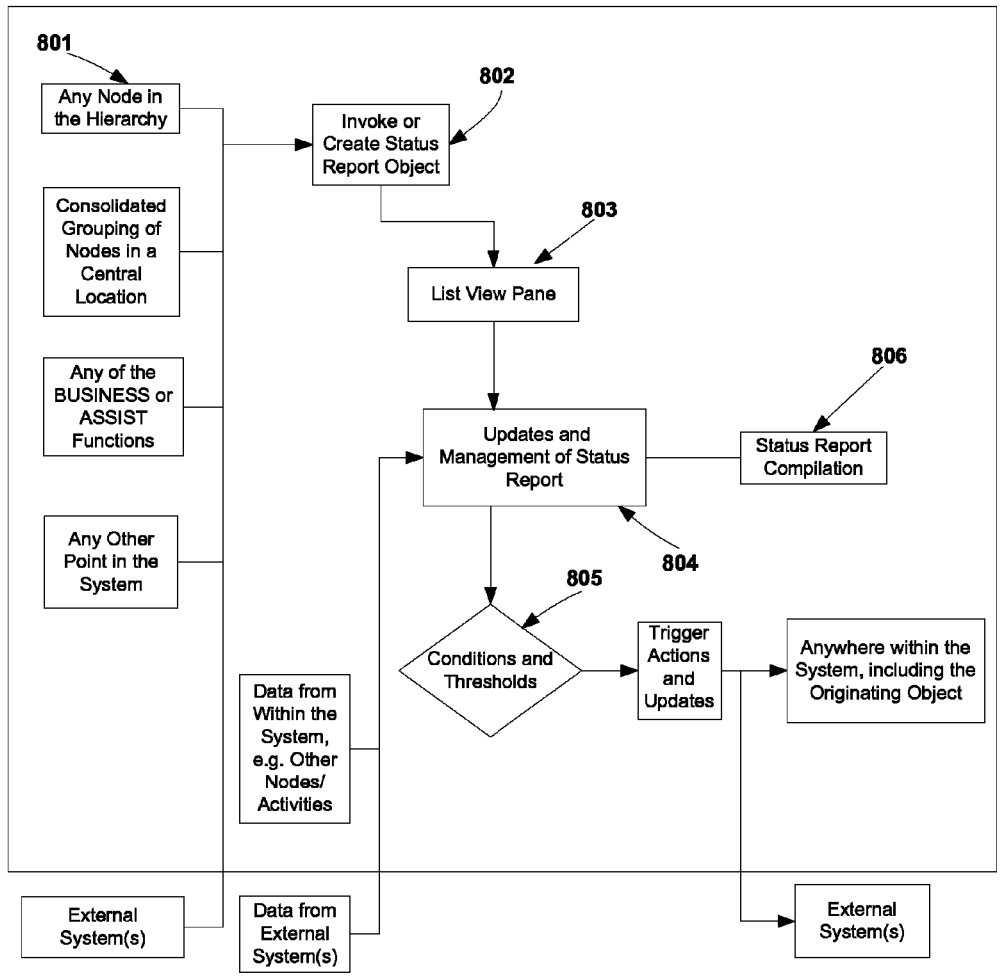
FIG. 8 illustrates an embodiment of the invention to enable each node or a source to create a status report and manage flow of its information through the hierarchy.

FIG. 8 describes a method to create, maintain, display and access Status Report function that can be invoked 802 at every node 801 or any other source and links it to the invoking node/source, localizing the data for speedy retrieval. The Status Report tracks Categories such as Deadline, Scope, Budget, Quality, Resource etc., with supported attributes such as description, progress status, risks, issues, due date etc. Information is updated through the Detail pane and/or is also imported from external systems. Related data from this function can be exported to any function within the system and/or external systems. Workflows can be invoked based on conditions and thresholds 805 set that perform actions in within this or other functions within the system, or external to the system. Updates can be made to each Category, color flags can be assigned, and supporting details and status entered, depicting health of each Category. The Status Report can be public or private, the former enabling the flow and display to the upper layer of hierarchy, while the latter prevents others from viewing. The Status Report is accessed through a hyperlink from the List View 803 (attribute SR), or from a tab in the Detail pane. Through user or system controlled mechanism, the Status Report information can flow to other nodes or distributed around 804. Information summary can be extracted from each Status Report to be reported to the higher level management, including combining details from multiple Status Reports 806. The method enables interactive collaboration to manage a Status Report through its entire lifecycle. The Assist Functions and Business Functions options are available here to use here, and their related information is localized to each Status Report. History is maintained for future reproduction. Status Reports from each node are consolidated and accessible from a central location also. A lock can prevent future modifications. The information is secured, downloadable and printable. Reports can be generated and posted or displayed in this function, other function in the system or in different systems.

Figure 9:
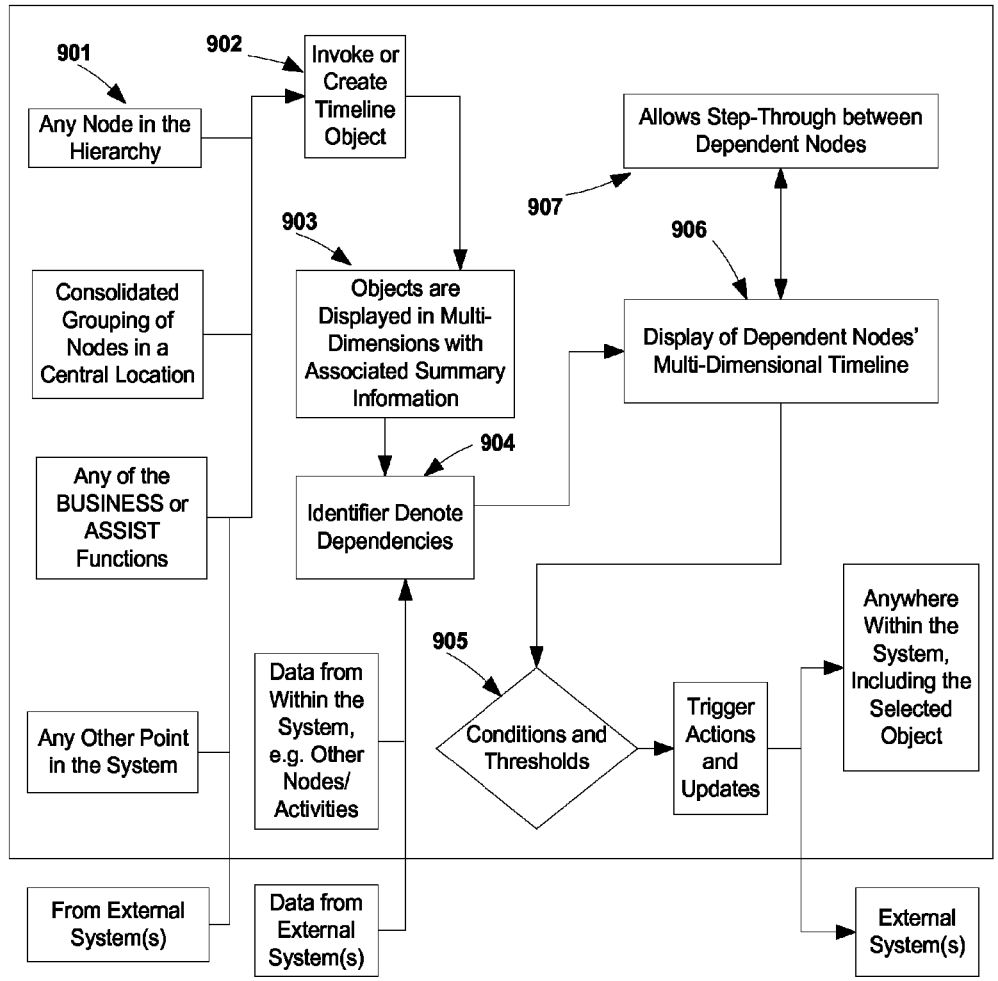
FIG. 9 illustrates an embodiment of the invention to enable each node or a source to create timeline chart of its children nodes and enable direct access of their inter-linked dependent nodes.

FIG. 9 describes a method to create, maintain, display and access, a structure for Timeline charts and Dependent Charts which is invoked 902 from each node 901 or any other source. The timeline of all the children nodes is displayed in multi-dimensional view 903, with timestamps and other pertinent data points printed. Any node that has a dependency displays a pre or post requisite Identifier 904, which when selected, instantaneously very easily flip flop between pre and post dependencies 906, and also step backward or forward to each chained dependent node 907. This interlink and step-either-way approach provides access and oversight to the complete sequence of activities, thereby allowing users to quickly catch new or potential delays, and adjust their own node's activities. Dependent Nodes' change in start/end dates automatically force a different warning color (such as flashing red) on the source node timeline, allowing user to take notice and investigate or take action. Once acknowledged, user can reset the warning flag back to normal. Each displayed timeline line is a hyperlink that provides an instantaneous access to its source data and List View summary. Conditions and thresholds 905 enable triggers that perform actions in within this or other functions within the system, or external to the system. The Timeline & Dependencies from different nodes can be consolidated and accessible from a central location. Functions from Assist Functions and Business Functions menus are accessible and usable in this function, with the relevant information tracked and localized at the source where they are invoked from. History is maintained for future reproduction, and locks to prevent future modifications. The information is secured, downloadable and printable. Reports can be generated and posted or displayed in this function, other function in the system or in different systems.

Figure 10:
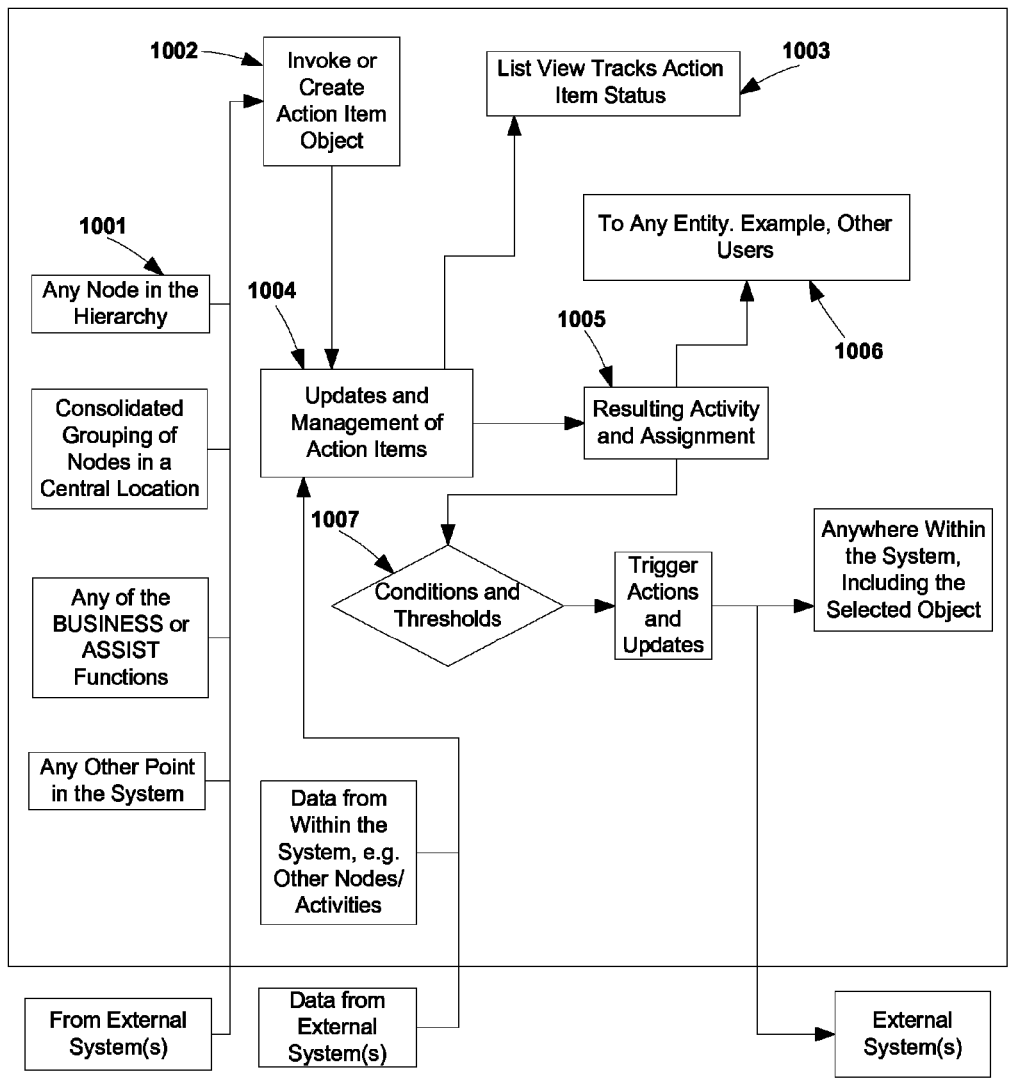
FIG. 10 illustrates an embodiment of the invention to enable each node or a source to invoke and track action item workflows.

FIG. 10 describes a method to create, maintain, display and access a structure for Action Items function that can be invoked from every node 1001, 1002 or any source point and localizes the information at the invoking node for speedy retrieval and at the source management. Action Items with workflows 1004, 1005 created can be assigned to people, groups, systems 1006 etc., enabling interactive collaboration and management through its entire lifecycle, and the method tracks updates and details, progress, criticality, due dates, warning flags etc. and conditional/unconditional 1007 settings that trigger other actions. Assigned people can receive the workflow notification in their email system, mobile or other device, and can provide updates from it, or log into the system and through My Page or directly in the workflow function, update the details. The method enables children Action Items to be created and managed under a parent Action Item workflow. The List View 1003 provides and updates real time summary, and the warning flag colors intensify as time starts to run out, and enables creation/modification/deletion and other operational actions. When the source node is viewed as a child node in the List View, its AI field displays a value of Y indicating a presence of Action Items. Selecting this value Y displays the Action Items details. Documents can be attached to Action Items, and other system Assist and Business functions can also be invoked from Action Items, localizing the related information. Locks can prevent future modifications. History is maintained for audit and other purposes. Action Items from each node can be consolidated and accessible via a central location. The information is secured, downloadable and printable. Reports can be generated and posted or displayed in this function, other function in the system or in different systems. The Action Items function enables individuals to eliminate manual (spreadsheet, Word) tracking of actions while managing initiatives and tasks, and instead allows centralized and localized management of actions at the source to provide privacy, but also secure information for audit, and invokes automated workflows to enable recipients to address them.

Figure 11:
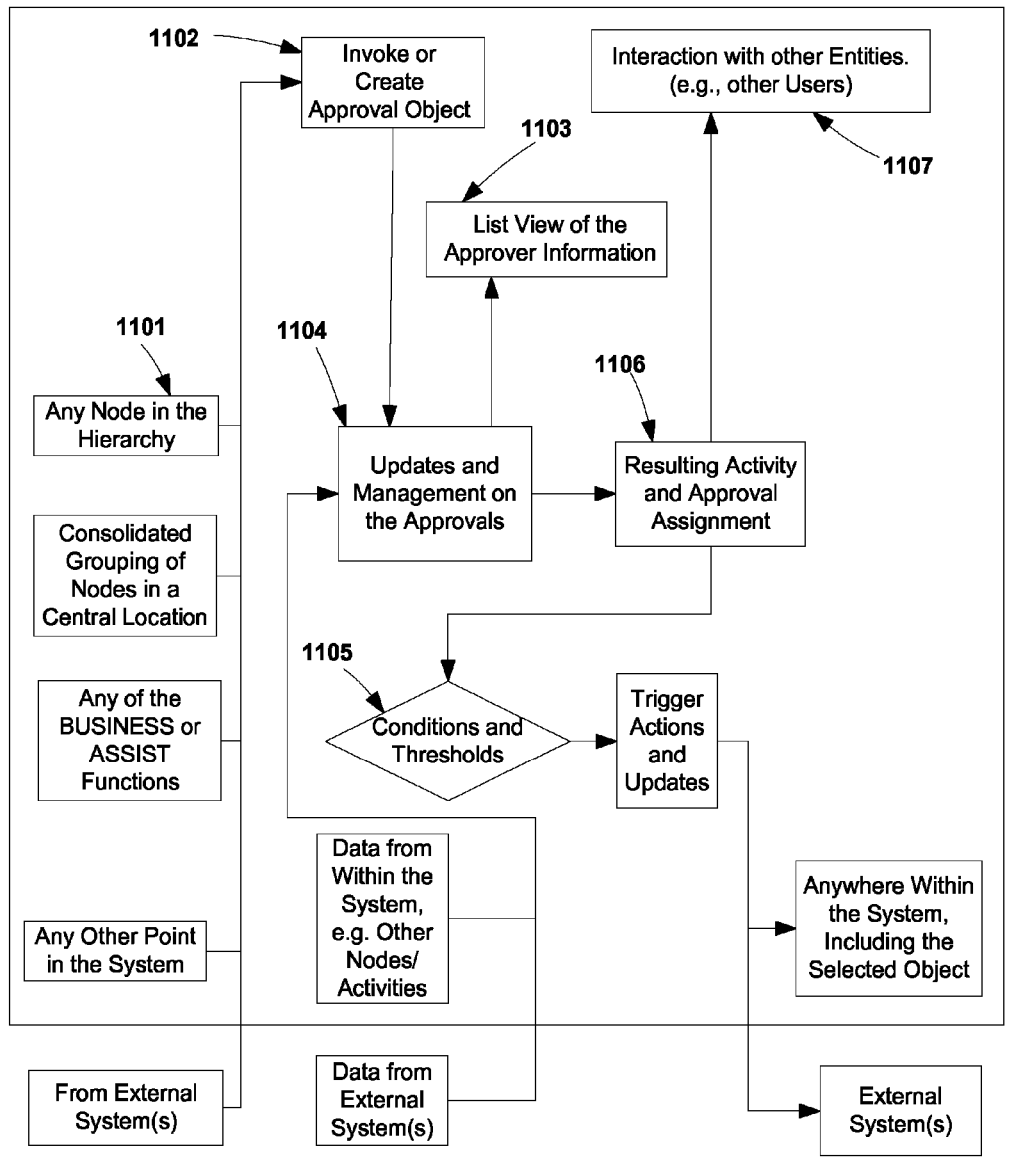
FIG. 11 illustrates an embodiment of the invention to enable each node or a source to invoke and track approval workflows.

FIG. 11 describes a method to create, maintain, display and access a structure for Approval workflow function that can be invoked 1102 from every node 1101 or another source, and the linked approval workflows and related information are localized to the invoking node for speedy retrieval and at the invoking source. Invention enables nested children approval workflows. New Approval workflows enable management 1104 and listing 1103 of approvers and their order, due dates, progress, warning flags etc. and conditions and thresholds 1105 settings that trigger other actions. Submitted Approval workflows 1106 invoke alerts and notifications and enable Approvers to respond from their email system, mobile and other devices, and the status gets updated accordingly, and also allows other systems to respond to the requests 1107, and enables interactive collaboration and management of the workflow through its entire lifecycle. Notifications also get displayed in the user My Page in the system. A variety of warning flags are supported that include progress flag, duration flag, urgency flag etc. The List View 1103 displays the summarized information for each workflow and enables creation/modification/deletion and other operational actions. When this node is viewed as a child node in the List View, its AP field displays a value of Y, indicating a presence of Approval workflows. Selecting this value Y displays the Approval workflows. Each Approval Workflow allows attachment of documents, and invocation of other Assist and Business functions and their related information is localized to the invoking workflow. Locks prevent Approvals from future modifications. Approvals workflows from each node can be consolidated and accessible from a central location. History tracking enables reproduction of information for audit and other purposes. The Approval workflow information is downloadable and printable.

Figure 12:
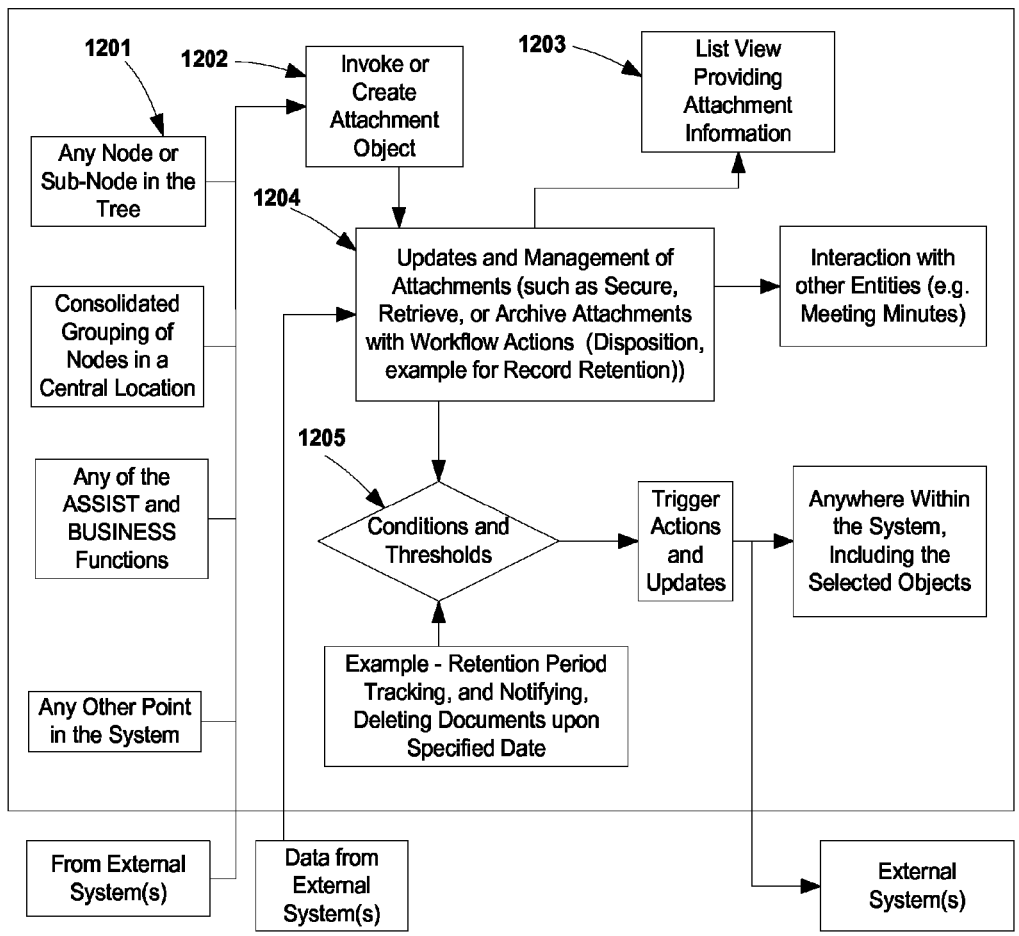
FIG. 12 illustrates an embodiment of the invention to enable each node or a source to invoke, track, and access an attachment with supporting workflow.

FIG. 12 describes a method to enable invoking 1201, 1202 and storing of attachments at every node or any source, and the linked attachments are accessible from the invoking node, thereby localizing the data for speedy retrieval. The method enables supports nested folder structure and the documents can be uploaded, opened, printed, downloaded, deleted or replaced etc. 1204, with timestamps and other attributes tracking relevant information (notes, expiration/due date, keywords, importance, assigned to, triggers etc.) displayed through a summary List View pane 1203 which also enables creation/modification/deletion and other operational actions. This Attachment function is available within each Assist and Business Function options (Approvals, Action Items, Meetings, Business Considerations, Dependencies, Budget, Asset Scheduling, Reports, issue/Risk/Vendor/On Call Management, etc.). The documents can also be accessed from the hyperlink on the List View pane which displays an indicator that denotes the presence of attachment for each node displayed, under attribute AT. A workflow is associated with each attachment to enable interactive collaboration and its lifecycle. Conditions and thresholds 1205 enable triggering of actions across any function within the system or outside systems. A lock prevents documents from future updates. Documents from different nodes can be consolidated and accessible from a central location. History tracking enables reproduction of information for audit and other purposes. The information is secured, downloadable and printable. Reports can be generated and posted or displayed in this function, other function in the system or in different systems.

Figure 13:
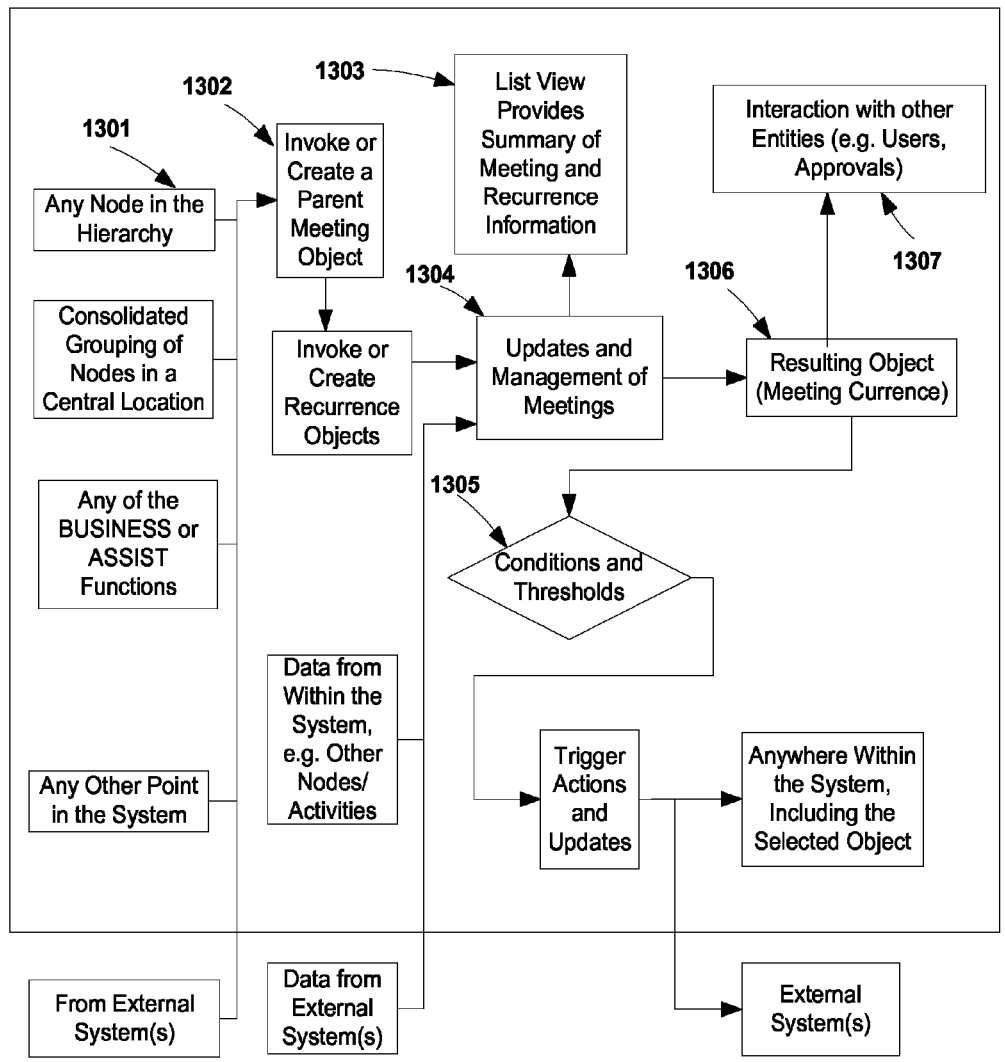
FIG. 13 illustrates an embodiment of the invention to enable each node or a source to invoke and track information within meetings and its occurrences.

FIG. 13 describes a method to create, maintain, display and access a structure for Parent Meetings and its nested Occurrences structure. A Parent Meeting is invoked 1302 from every node 1301 or any source and the information tracked within the Meetings and Occurrences is permanently linked to the related node or source, and accessible speedily at the invoking source. Occurrences of meetings are created within each Parent Meeting. The Parent Meeting allows tracking of master information such as business relation to the meeting, sponsors, agenda, start/end dates, attendees etc. information. The Occurrences additionally contains similar information, and additional information geared towards a specific meeting held on a specific date. The Parent Meetings and their Occurrences can be linked to other meeting and calendaring systems such as Microsoft Outlook, IBM Notes etc. and data is transferable back and forth. Each Occurrence tracks the minutes, important decisions, attendees, other information, keywords 1304 and attachments. This information 1306 is permanently linked to the Parent Meeting and the invoking source node. The List View pane 1303 displays the status of each Parent Meeting and its Recurrence that show the progress, warning flags, due dates and other attributes. The Recurrence is accessible by expanding the Parent Meeting in the List View. The Parent Meeting and the occurrences are editable, can be deleted and a new one can be created. Workflows, conditions and thresholds 1305 enable triggering of actions across other functions of the system or other systems. The method enables interactive collaboration between users, systems and processes 1307 across the workflows of each Meeting and its Occurrence. The List View pane 1303 displays important information in a summarized form and enables creation/modification/deletion and other operational actions. When this node is viewed as a child node in the List View, a MT field can be inserted in the List View that displays a value of Y, indicating a presence of Meetings. Selecting Y displays the Meetings List View listing the Parent Meetings and their Occurrences linked to that node. The Meetings and their Occurrences are editable. Each meeting and Occurrence instance allows attachment of documents. The system allows these Meetings and their Occurrences to be locked and their status permanently maintained and accessible at the source node or other means. The system further enables Meetings and their Occurrences for all nodes to be maintained and accessible from a central location also, displaying each source node and its related Meetings/Occurrences. The system tracks the Meeting and Occurrence management and content history and can apply a lock to prevent future modifications. The information is secured, downloadable and printable. Reports can be generated and posted or displayed in this function, other function in the system or in different systems.

Figure 14:
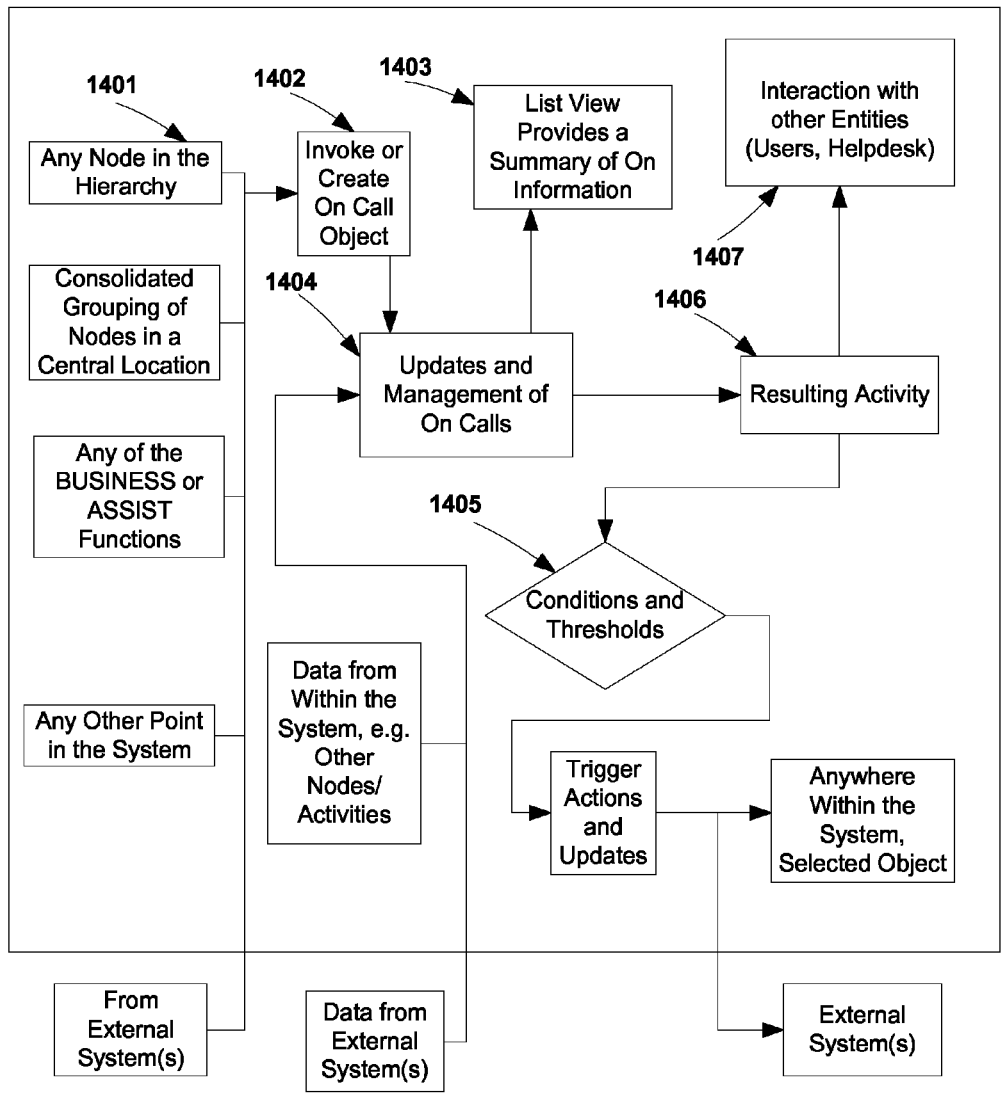
FIG. 14 illustrates an embodiment of the invention to enable each node or a source to invoke and track on call list and enable others services to access and invoke workflow-based actions.

FIG. 14 describes a method to create, maintain, display and access a structure for On Call Management function that can be invoked 1402 from every node 1401 or any source and its data is permanently linked to the invoking node, localized for speedy retrieval. A manager can define 1404 many Shift Duration Instances 1406, each listing the duration of the shift (via start and end date) order of person on call, contact information, escalation wait time, alerts when wait time expires, etc. When other services such as Help Desk or Call Center receives a problem call, they can access 1407 the related application's On Call List that is displayable through a summary view or List View pane 1403, and call the individuals in the order defined and per the escalation time window. The method enables setting of alerts which starts the timer, and upon reaching the defined wait period for that person, the system sends an alert to the Help Desk or any user that triggers the timer, prompting them to escalate upwards if call-back is not received from the first person. The workflow for each person on call enables automatic calling of the on call person's number that could be a telephone number, email or any other mode of notification. The method also allows conditions and threshold 1405 setting that trigger other actions and events, workflows and notifications. Functions from Assist Functions and Business Functions menus are accessible and usable in this function, with the relevant information tracked and localized at the source where they are invoked from. The List View pane 1403 displays important information in a summarized form and enables creation/modification/deletion and other operational actions. Historical data is maintained for future reproduction, and locks prevent future modification. The information is secured, downloadable and printable. Reports can be generated and posted or displayed in this function, other function in the system or in different systems. On Call Lists from different nodes can be consolidated and accessible from a central location. The On Call List information is downloadable and printable. This function is eliminates weekly assimilation of shift On Call list from each product team through emails, and then having to consolidate all in a spreadsheet, and try to search for the right person when the urgency need arises. The huge weekly or monthly manual effort by each manager and Help Desk is totally eliminated.

Figure 15:
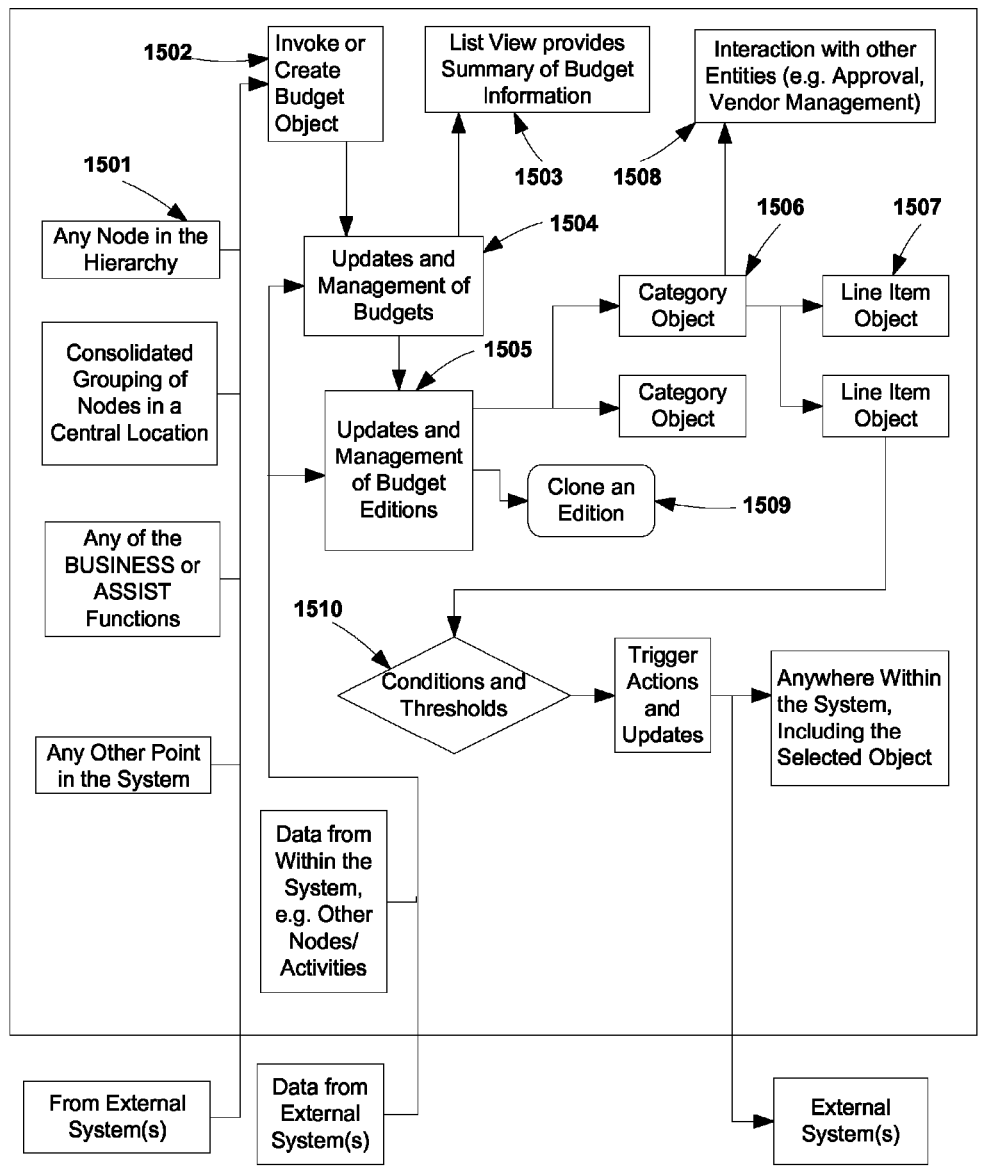
FIG. 15 illustrates an embodiment of the invention to enable each node or a source to invoke and track Budget information within each umbrella supporting multiple editions, categories and line items, each supported related workflows.

FIG. 15 describes a method to create, maintain, display and access a structure for Budget function that can be invoked 1502 from every node 1501 or any other source and links the budget information to the invoking source node, localizing the data for speedy retrieval. The Different Editions such as Planned 1505, Approved, To-Date, Forecast etc. can be created under a parent budget umbrella 1504, allowing tracking of separate budgets for the same node or source. The List View pane 1503 displays critical information in a summarized format and enables creation/modification/deletion and other operations. Each Edition can track high level items under a Category Line 1506, which can next many Line Item 1507 details that track expenditures and transactional information, progress, warning flags and related costs. Each parent umbrella, Edition, Category and Line Item supports workflow capability to enable interactive collaboration. The data attributes such as Total Cost, Capitalized Cost, Expense Cost etc. enable tracking of expenditures, broken down at separate Capitalized and Expense Cost level. Mathematical computation enable costs to be programmatically calculated and displayed in the remaining fields, based on numbers entered on any one field. All the Line Item totals are programmatically summarized at the Category Line level, and all the Category Line totals are summarized at the overall summary bar, providing real-time information. Data from any Edition can be copied to another Edition 1509, and values between any two Editions can be synchronized at any time. Expenditures from Vendor Management or any other function can be synchronized and reconciled to any Edition 1508. The Assist and Business Functions are available for user. Reports can be generated and displayed from any access point. Thresholds and conditions 1510 can be set to trigger actions, events, workflows and notifications. The List View pane displays critical information in a summarized format, including comparative Planned, Approved, To-Date and Forecast budget numbers. Functions from Assist Functions and Business Functions menus are accessible and usable in this function, with the relevant information tracked and localized at the source where they are invoked from. History is maintained for future reproduction, and editions can be locked to prevent modifications. Budget from different nodes can be consolidated and accessible from a central location. The information is secured, downloadable and printable. Reports can be generated and posted or displayed in this function, other function in the system or in different systems. This function streamlines and eliminates errors, delays and budget overruns due to manual tracking, and automates systematically and organizationally by allowing users to create different editions, as their initiative kicks off from planning to closure stage.

Figure 16:
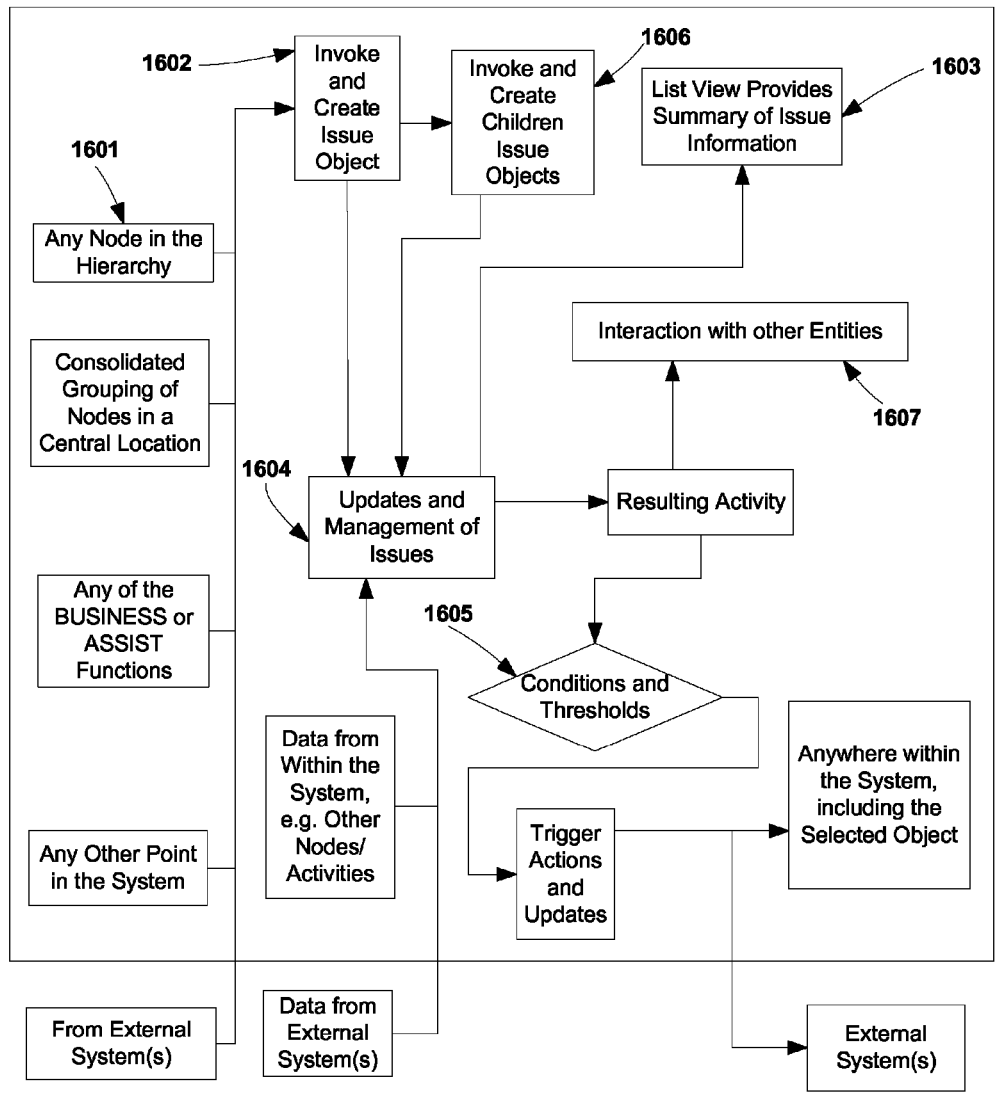
FIG. 16 illustrates an embodiment of the invention enable each node or a source to invoke and track issue entity with nested entities, each supporting related workflows.

FIG. 16 describes a method to create, maintain, display and access a structure for Issue Management function that can be invoked 1602 from every node 1601 or any source and links the invoked entity to the invoking node, localizing the data for speedy retrieval. Parent and children entities can be created 1606, allowing granularity to track different aspects of the same Issue. Functions from Assist Functions and Business Functions menus are accessible and usable in this function, with the relevant information tracked and localized at the source where they are invoked from. The List View pane 1603 displays the important summary information and enables creation/modification/deletion and other operations 1604. Workflow capability enables interactive collaboration 1607 to manage the work order progress and dynamic creation of new Issue entities, as well as automatic updates to existing entities when new issues are encountered in other functions within the system or external system. Thresholds and conditions 1605 can be set to trigger actions, events, workflows and notifications. Historical data is tracked for future reproduction, and locks prevent future modifications. Tickets from different nodes can be consolidated and accessible from a central location. The information is secured, downloadable and printable. Reports can be generated and posted or displayed in this function, other function in the system or in different systems. Issue tracking at the source of the activity which can be managed centrally, and at-a-glance view of criticality, importance etc. enables users to quickly resolve the Issues and prevent unwarranted impact, delays and budget overruns.

Figure 17:
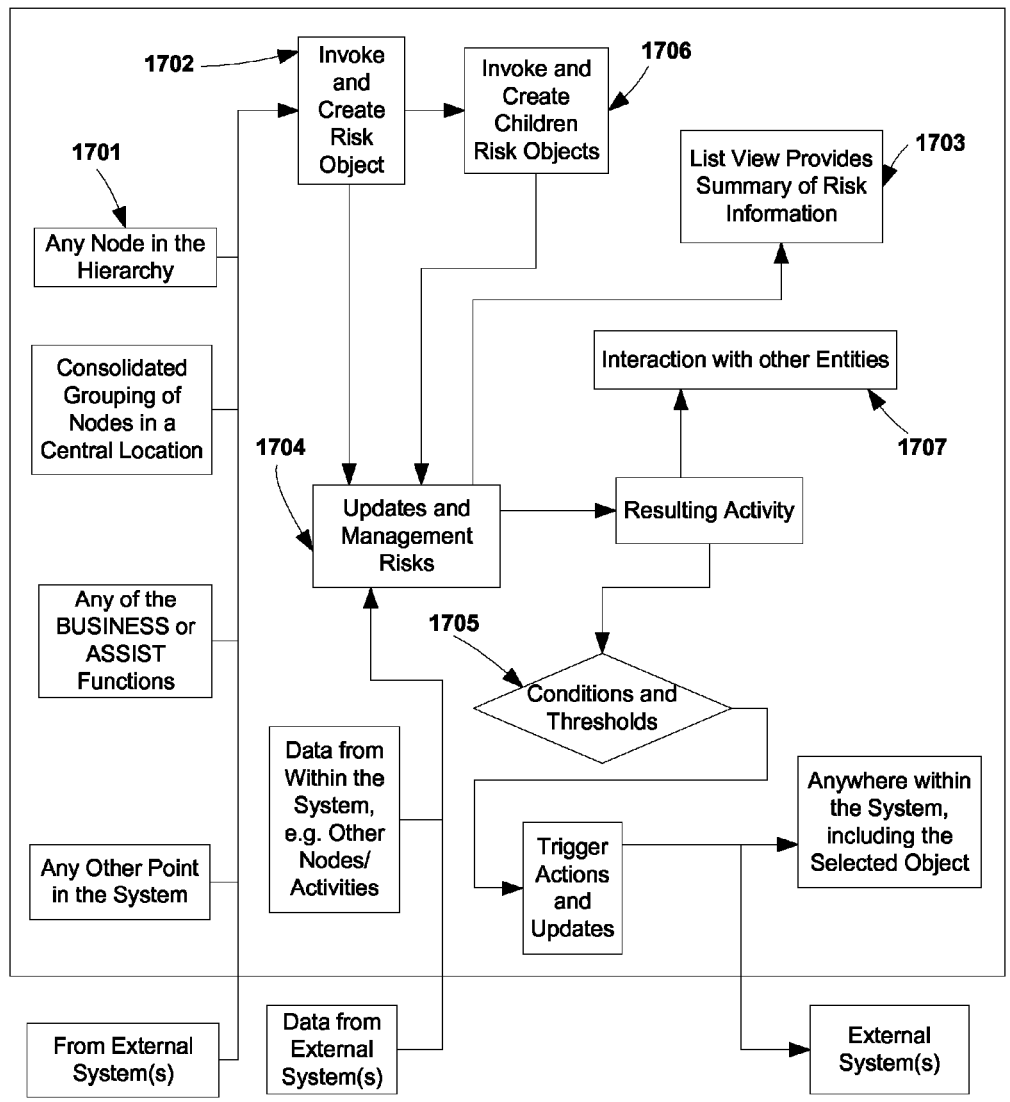
FIG. 17 illustrates an embodiment of the invention to enable each node or a source to invoke and track risk entity with nested entities, each supporting related workflows.

FIG. 17 describes a method to create, maintain, display and access a structure for Risk Management function that can be invoked 1702 from every node 1701 or any source and links the invoked entity to the invoking node, localizing the data for speedy retrieval. Parent and children entities can be created 1706, allowing granularity to track different aspects of the same Risk. Functions from Assist Functions and Business Functions menus are accessible and usable in this function, with the relevant information tracked and localized at the source where they are invoked from. The List View pane 1703 displays the important summary information and enables creation/modification/deletion and other operations 1704. Workflow capability enables interactive collaboration 1707 to manage the work order progress and dynamic creation of new Risk entities, as well as automatic updates to existing entities of new risks encountered in other functions within the system or external system. Thresholds and conditions 1705 can be set to trigger actions, events, workflows and notifications. Historical data is tracked for future reproduction, and locks prevent future modifications. Tickets from different nodes can be consolidated and accessible from a central location. The information is secured, downloadable and printable. Reports can be generated and posted or displayed in this function, other function in the system or in different systems. Risk tracking at the source of the activity which can be managed centrally, and at-a-glance view of criticality, importance etc. enables users to quickly resolve the risk and prevent unwarranted impact, delays and budget overruns.

Figure 18:
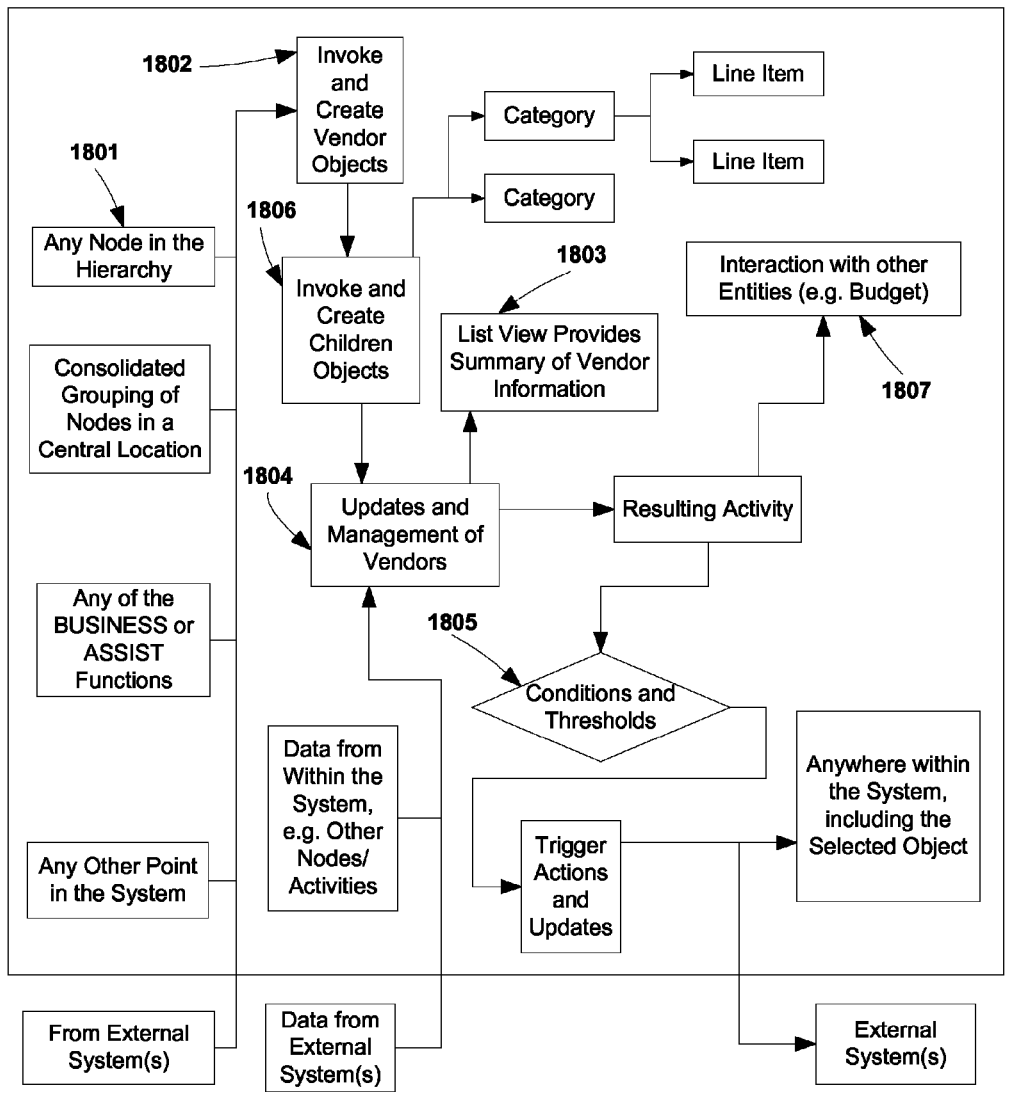
FIG. 18 illustrates an embodiment of the invention to enable each node or a source to invoke and track a vendor or third party management entity with nested entities, each supporting related workflows.

FIG. 18 describes a method to create, maintain, display and access a structure for Vendor Management function that can be invoked 1802 from every node 1801 or any other source, and links the invoked Vendor Management information to the invoking source, localizing the data for speedy retrieval. A parent Vendor entity created enables creation of children entities 1806, categories and line items that can host any type of activity such as expenditures, transactional and operational etc. within the pertaining Vendor's tracking area. The incurred expenditure, at user control, can be automatically propagated to the pertaining node's Budget function, which then reconciles the actuals in the To-Date Edition. The incurred expenses are summarized at each level, from line items to categories, from categories to child vendor entity and from children entities to parent entity level. The related summary can be reported in any format at any level, at any access or display point including the List View pane 1803 which enables creation/modification/deletion and other operations 1804. Workflows enable interactive collaboration between users and systems 1807. Thresholds and conditions 1805 can be set that trigger actions, events, workflows and notifications. Functions from Assist Functions and Business Functions menus are accessible and usable in this function, with the relevant information tracked and localized at the source where they are invoked from. Historical data is maintained for reproduction, and locks prevent modifications. The Vendor information from different nodes can be consolidated and accessible from a central location. The information is secured, downloadable and printable. Reports can be generated and posted or displayed in this function, other function in the system or in different systems. This function is especially useful in managing projects and programs as it eliminates the need to use spreadsheet to track the same information manually.

Figure 19:
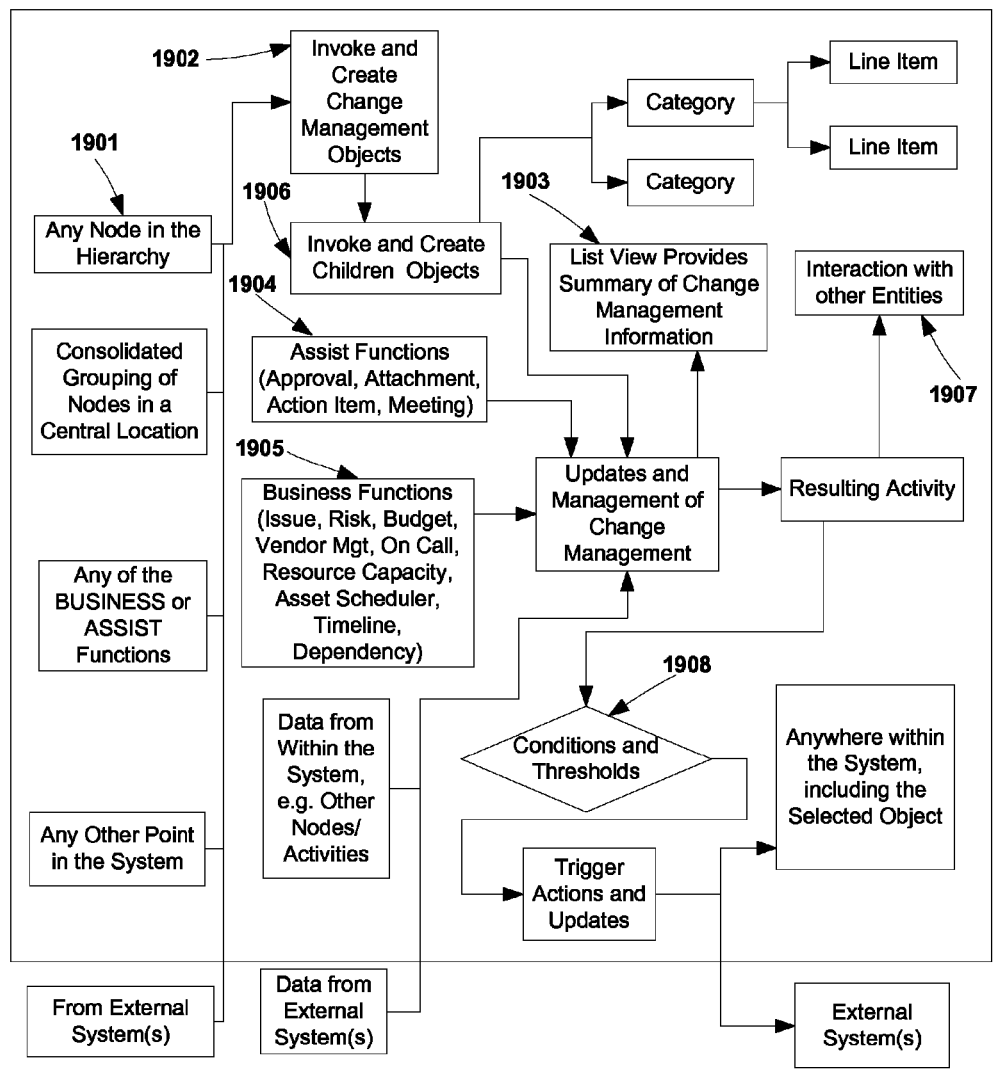
FIG. 19 illustrates an embodiment of the invention to enable each node or a source to invoke and track change management entity, with nested entities, each supporting related workflows.

FIG. 19 describes a method to create, maintain, display and access a structure for Change Management function that can be invoked 1902 from every node 1901 or any source and links the invoked entity to the invoking node, localizing the data for speedy retrieval at the source of invocation. Parent and children entities can be created 1906, allowing granularity to track different aspects within the entity. Functions from Assist Functions 1904 and Business Functions 1905 feed updates to the entity. The List View pane 1903 displays the important summary information and enables creation/modification/deletion and other operations 1906. Workflow capability enables interactive collaboration 1908 to manage the work order progress and dynamic creation of new entities, as well as automatic updates to existing entities encountered in other functions within the system or external system. Thresholds and conditions 1909 can be set to trigger actions, events, workflows and notifications. Historical data is tracked for future reproduction, and locks prevent future modifications. Tickets from different nodes can be consolidated and accessible from a central location. The information is secured, downloadable and printable. Reports can be generated and posted or displayed in this function, other function in the system or in different systems. Change tracking at the source of the activity which then can be accessed and managed from a centralized location, and at-a-glance access of criticality, importance etc. enables users to quickly take swift actions to enable the work that is being requested, enabling a smooth governance and effective flow and sharing of information. This prevents unwarranted impact, delays and budget overruns.

Figure 20:
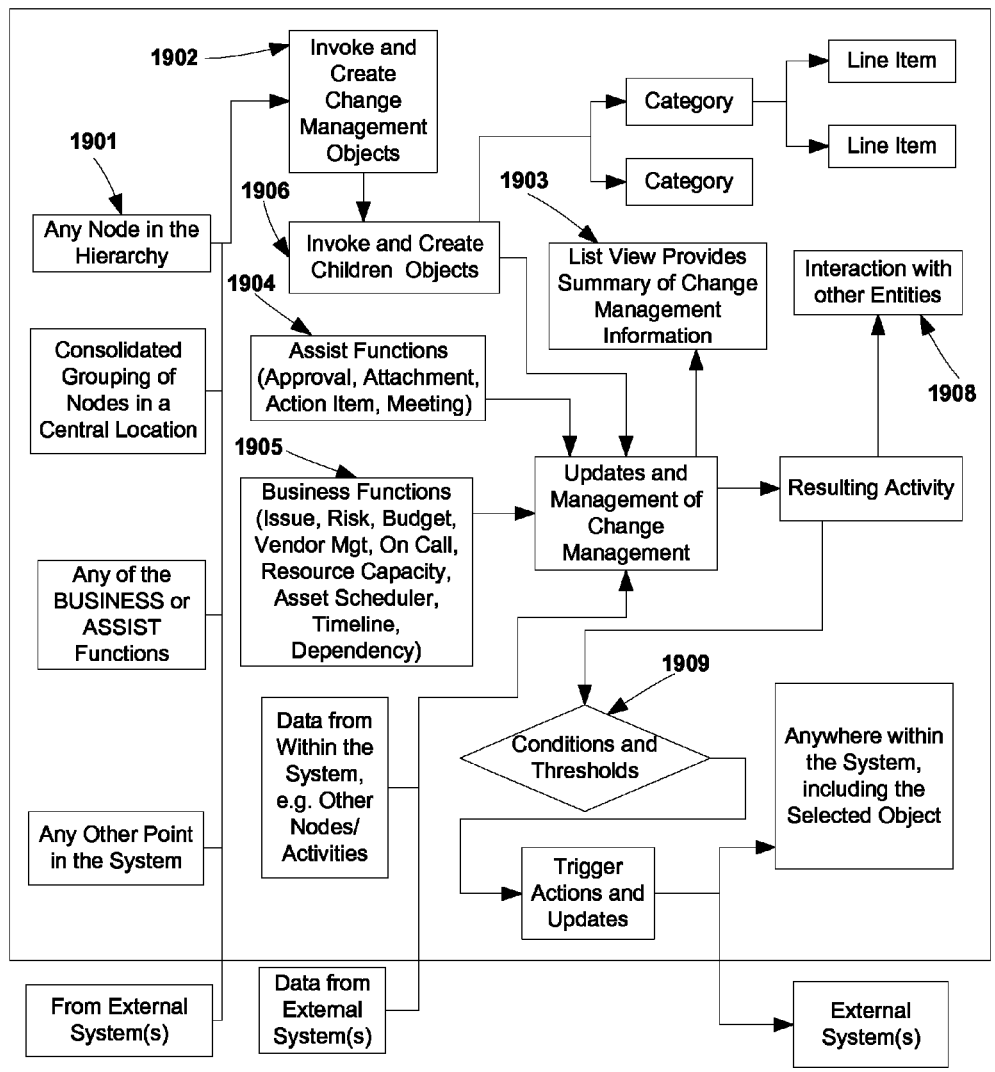
FIG. 20 illustrates an embodiment of the invention to enable each node or a source to invoke and track report, consolidated reports and look ahead reports, each supporting related workflows.

FIG. 20 describes a method to create, maintain, display and access a structure for Reports and Look Ahead capability that can be invoked 2002 from every node 2001 or any other location. The Reports generated 2005 can provide any information from any nodes, a collection of nodes, and any of the functions. The reports provide real-time and static information that is presented in any format, statistical, graphical 2003 etc. The source of data is from all the features and functions within the system, that include all Program-Project, Activity, Task, Assist and Business Functions, and also from other external systems. The values and fields displayed in the Reports are hyperlinked to provide direct access to the source of the information and to enable creation/modification/deletion and other operations 2004. Functions from Assist Functions and Business Functions menus are accessible and usable in this function, with the relevant information tracked and localized at the source where they are invoked from. Reports from each node or any source point are consolidated and accessible from a central location. History is maintained for audit or other purposes. The information is secured, downloadable and printable. Real-time reporting and reports are extremely important in every company to provide the health of the initiatives. The Reporting function, combined with the List View or other form of display summary function that is enabled at each node in a hierarchy provides the necessary information real-time to every level of functional, technical and management layer, accumulating the data and/or summarizing at each level up, all the way to the company's Executives and Parent company, in the case of multiple subsidiaries. Many different Reports can be combined and summarized to form a Consolidated or Executive Report 2007. The workflow capability enables interactive collaboration between people, systems and processes 2006. FIG. 20 also describes a method to create, maintain, display and access a structure for Look Ahead function 2009 which is just a type of interactive Report that can invoked from every node and displays pertinent information localized at the invoking node, and those nodes nested under it, including allowing modifications. Invoking Look Ahead presents criteria for range of dates, and defined durations such as Ending This Week, Ending Next Week, Ending This Month etc. that list all the nodes due that date. The displayed summary information is hyperlinked to enable direct access to the source of the data. Conditions and thresholds 2008 enable triggering of actions across other functions and systems, including alerts and warning flags. Children and sub-children nodes of the displayed nodes can be accessed from the displayed information.

Figure 21:
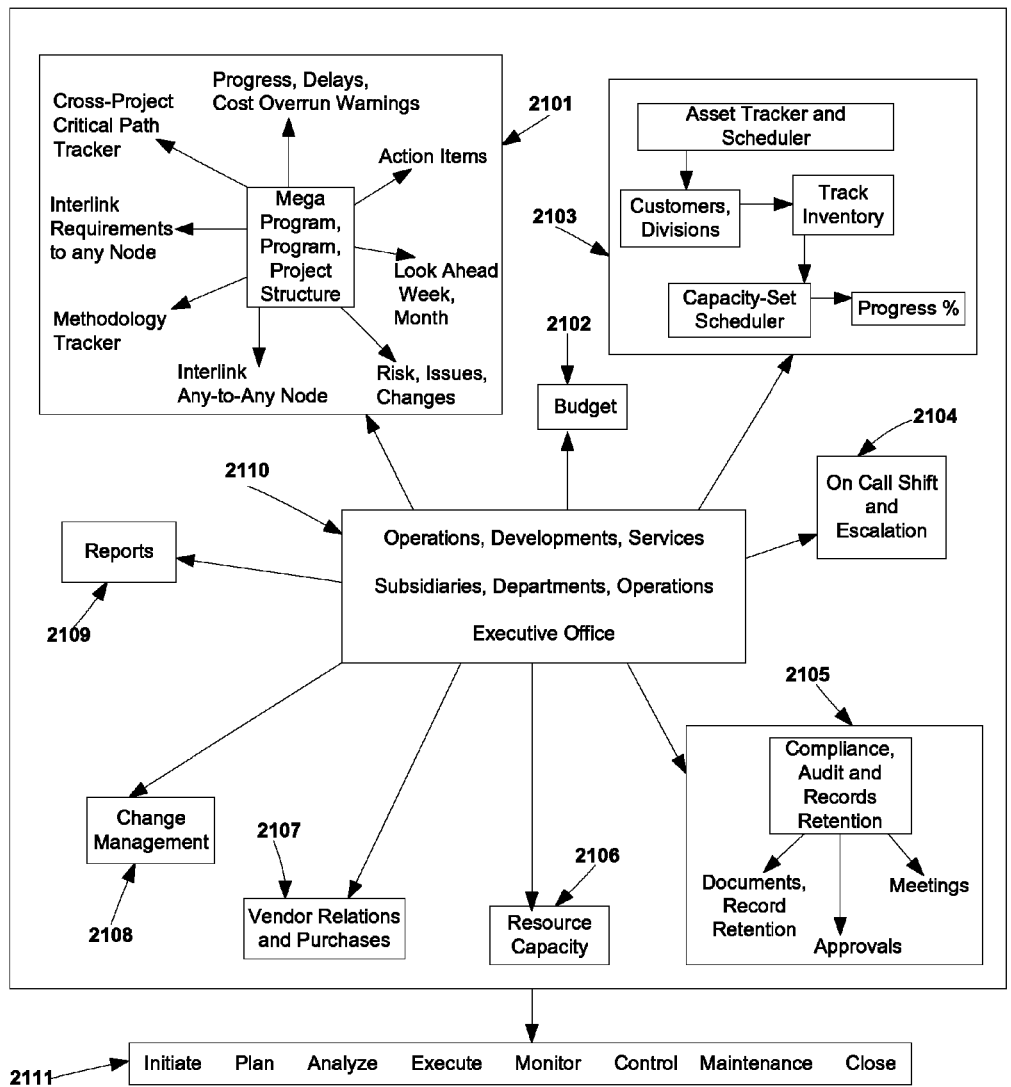
FIG. 21 illustrates an embodiment of the invention to enable each function to interact seamlessly or otherwise with one another, providing the harnessing capabilities to users, systems and processes within the system and to external users, systems and processes.

FIG. 21 describes a method to create, manage, access and display all the related structures for enabling all the functions and features from Assist and Business Functions to operate seamlessly with one another and with the base hierarchical structure. These functions can be invoked from every node or any other location. This figure illustrates one example of selective functions are grouped in categories that provide complete visibility in the area of interest. The Mega Program, Program Project Lifecycle structure 2101 is a collection of base hierarchical tree with each node representing a level of authority and the capability create sub-layers (that is, nested nodes) and to invoke any of the functions Progress, Alerts and Warning Indicators, Look Ahead, Process Tracking, Real time Business Considerations and Cross-Project Dependency interlinking, Dynamic Cross-Project Critical Path, Action Items and Risk, Issues, Changes 2101, Budget 2102, Asset Tracker and Scheduler 2103, On Call Shift and Escalation 2104, Compliance, Audit Regulators and Record Retention 2105, Resource Capacity 2106, Vendor Relations and Purchases 2107, Change Management 2108 and Real-time Statistical and Status Reports 2109 with the system. The Meet your Compliance, Audit, Regulatory and Records Retention Requirements structure 2105 enable governance management at each node. The Budget 2102 function provides a means of managing financial and money related activities for each node through separate Editions. The Asset Tracker and Scheduler 2103 function, invoked from every node, enables every action and capability of that function at the invoking node and may be related to that node (example, project). The On Call Shift and Escalation 2104 function provides the function's management capability at every invoking node. The Resource Capacity 2106 for people and non-people, Vendor Relations and Purchases 2107 and Change Management 2108 functions enables every node to invoke and manage these functions. The Reporting function 2109 enables statistical, graphical, tabular and other displayable nodes to present information of the functions in collection or selectively, and can be invoked from every node. The method enables information to be received from other systems/processes/users and process it within the system's functions, and distribution of information to other systems, processes and users. The collection of functions and structures enables, but is not limited to management of various operations, developments, services and administrations 2110. The method supports commercial and custom phased delivery that comprises of distinct phases, as one such illustration is shown 2111.

Having described the invention above, various modifications in architecture, programming, steps and presentation will be apparent to those skilled in the art. It is intended that all such variations within the scope and spirit of the invention be included within the scope of the appended claims.

DRAWINGS

Examples of Artifacts, User Interfaces and Methods, Flow Diagrams, Data Structures and Systems according to the present invention follow as illustrations. The illustrations depict how the inventive methods can be implemented. Actual designs are not limited to what is depicted here as the illustrations depict only one embodiment of the present invention.

Provide one embodiment of the invention with respect to the present methods.

FIG. 2 depicts images that provide one embodiment of the invention with respect to a user interface for working with software and hardware according to the present invention. Other formats and other types on interfaces can be used according to the present invention.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A computer implemented method for the management of divisional entities and extremely large programs and projects comprising:

a computer performing the steps of:

building a nested hierarchy of nodes representing multiple logical and geographic partitions of a local or global divisional Enterprise or Government entity, and the mega-programs and mega-projects that can span several of those partitions, navigating the hierarchy from a top node or major node, which represents a mega-program, all the way down to the nodes representing division departments and projects, their activities, resources and assets allows real-time access to and step-up or step-down through each node's status information including status report, summary, and key performance indicators;

collaboratively invoking business functions, wherein the business functions are Resource Capacity Management, Asset Tracking and Scheduling, Budget Management, On-Call Management, Vendor Relations Management, Issue/Risk Management, and Change Management and assist/support functions, wherein the assist/support functions are Business Considerations, Dependencies, Status Reports, Approvals, Action Items, Attachments, and Meetings, at any node, establishing that node as the context for the current user-requested operation, that is, any function invoked at any source node or other point will retain its relevant information at the source, localizing the information that can be accessed directly from the source;

supporting bi-directional flow of information, with access to the information of the paired nodes from either end, with controls at each node to enable summarization or expansion of information, and automated or manual updates with override ability;

allowing multiple users to create, view, update and delete, any object and all pertinent information in the said hierarchy collaboratively and interactively;

enabling the implementation and tracking of various business processes, workflows, and condition and threshold based triggers;

further enabling the implementation and following of government, industry standard or organization-customized business, operation or administrative structure, involving several levels of nesting to capture the complexity of certain standard structures, and further enabling the invocation of access, display, updating and other actions from any selected node in the hierarchy;

allowing the recording, monitoring and auditing of all business considerations, including security and compliance governance, such business considerations and their supporting details involving several levels of nesting to capture the complexity of some considerations, further enabling the linking of these considerations to any node in the hierarchy, and tracking collaboratively their related information and attachments, including status information within the context of each invoking node or other invoking points;

storing related data elements of the method in one or more databases; and allowing the said hierarchy and the said business and assist functions to operate in one integrated, all-encompassing method that can be invoked from every node while localizing the pertinent information at the invoking node;

real-time updating and viewing of the status information of all nodes in the said hierarchy by multiple users collaboratively according to specific criteria including time or schedule, business criticality, complexity, risk, and compliance requirements depicted in statistical, graphical, and visual flag formats, enabling intelligence progress management that accounts for the said criteria in addition to traditional criteria such as the numbers of tasks completed and tasks remaining relative to the total number of tasks and elapsed time relative to allocated time;

computing the completion percentage at a node representing an activity such as a task, project, program and mega-program as a weighted average of the completion percentages of their child nodes, the weight factors being user-specified or system-computed;

assigning severity or priority levels to the said criteria such as business importance criticality, complexity and risk, high weight factors being assigned to high severity or priority levels, emphasizing the completion of high severity or high priority activities and deemphasizing the completion of simple, low severity or priority activities in the overall computed completion percentage;

carrying out the computation of completed percentages automatically up the hierarchy all the way from the bottom leaf nodes to the highest owning node, the values of the sibling nodes being averaged through computation and the resulting value being propagated to the parent node, and assigned to it;

providing the option to manually override the automatic progression of information with user-defined information at each node, which is in turn used for computation to derive the resulting value that is propagated upwards to its parent node;

mapping the method and user definable values of the input criteria for weight, importance criticality, complexity and risk through arrays or matrices;

controlling the flow of information from sibling nodes to parent nodes to be automatic, manual or through other defined criteria;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems;

notifying proactively users who are involved at a given node of the said hierarchy whenever the actual progress corresponding to that node falls behind the computed expected progress;

providing notification methods that include colored and flashing visual flags combined with verbiage in the user interface depending on the severity of the delays;

propagating progress and notification indicators upward throughout the hierarchy automatically, computing the resulting status indicator at each node from the status indicators of its child nodes using method or user defined logic;

providing the option of overriding the received information at any node from its child nodes with user-specified values and status indicators, computing new values in conjunction with subordinate child nodes and propagating the resulting value up to the parent node;

providing display and update access to each node's and its immediate child nodes' information including details, summaries and graphical representations;

enabling upward and downward navigation from a node indicating the presence of exceptions or issues to the dependent nodes where the exceptions originated, allowing for quick root cause analysis;

controlling the flow of information from sibling nodes to parent nodes to be automatic, manual or through other defined criteria;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems;

generating reports that can provide any information from any node of the said hierarchy, a collection of such nodes, and any of the assist and business functions;

accessing assist functions from the context of the report;

presenting real-time and static information in any format, including statistical and graphical tables and charts;

hyperlinking the values and fields displayed in the reports to provide direct access to the source of the information and enable creation, modification, deletion and other operations on the values reported;

consolidating reports and making them securely accessible, downloadable and printable from a central location;

maintaining history of reports for audit or other purposes;

providing the necessary information in real-time to every functional, technical and management layer, consolidating and/or summarizing the data at each level up, all the way into executive reports for the company's executives and parent company;

enabling through a workflow interactive collaboration between people, systems and processes;

generating Look Ahead reports which are interactive reports that can be invoked from any node to compile proactive views of upcoming activities by specific time duration or future trends, allowing for adjustments of current plans to prevent problems including delays and runaway budgets; and enabling condition and threshold based triggering of actions across nodes, assist/business functions, and external systems, including alerts and warning flags.

2. The method of claim 1, further comprising the staging steps of:

creating different multi-tiered structures of the said hierarchy and storing them in draft mode in the draft list of hierarchical structures;

keeping them in draft mode while they are still under construction and not ready yet for production use; and activating them once the new structures are completed and ready for production use, which causes them to be moved to the primary management list of hierarchical structures.

3. The method of claim 1, further comprising dependency relationship management, the method comprising the steps of:

dynamic interlinking of dependencies between any two nodes of the said hierarchy, including intra-program and inter-program dependencies, and involving any number of intermediary nodes, with the ability to link multiple dependent nodes to the invoking source point simultaneously;

assigning a specific type for each relationship link that represents time constraints, business and otherwise requirements, said business considerations, and capacity constraints; such dependency relationship types including prerequisite, post-requisite and reference;

flagging each node in the hierarchy that is involved in a dependency chain accordingly in the user interface with the capability to navigate the dependency chain back and forth with the display of source and target nodes and their pertinent status information;

enabling the selection of a dependency flag resulting in the display of the multidimensional timeline of the dependent node;

enabling the real-time access and display of the dependent information between multiple links in statistical and graphical formats;

supporting manipulation from either end of a link through dependency indicators or other means, enabling control over any two dependent nodes from either node in a progressive proliferation through the chain of dependencies;

depicting graphically relevant statistical information of children nodes and dependent node's performance indicators, enabling dynamic access to the corresponding dependent nodes;

displaying graphically and statistically the timeline and supporting information of dynamically selected dependent node and its parallel children nodes, enabling flip-flopping between any two nodes within the dependency proliferation chain;

triggering the appropriate changes of the status information of dependent nodes as a result of changes, that pertain to the criteria of the dependency, to the attributes or status of another node involved in the dependency chain, including warnings, and updates to timelines, status flags and workflows of business and assist functions;

enabling users to accept, reject, or reset changes to timelines and status flags;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems.

4. The method of claim 1, further comprising dynamic status report consolidation, the method comprising the steps of:

consolidating status reports up the said hierarchy in real-time and dynamically by compiling a status report at any node of the hierarchy upward from separate status reports that are posted at its child nodes, enabling executive managers to access in real-time accurate status information with comments from lower level management effortlessly;

providing the option to control of which part of a user's status report to escalate upward to the next management level;

enabling executive managers to drill down to more detailed versions of any section of the consolidated status report through each node's step down capability within the hierarchy;

providing status report compilations with a combination of formats such as textual, statistical, graphical, and categorization of data;

controlling privileged access through security control mechanisms at each node; and enabling conditional and unconditional triggering of actions and workflows across any point or function in the internal or external system, and status reports that may result in real-time population of information.

5. The method of claim 1, further comprising capacity-constrained scheduling, the method comprising the steps of:

capacity-constraint based scheduling based on priorities according to business or operational criticality, importance, risk, and complexity from any node in the hierarchy or point in the system;

providing a calendar, or other time tracking mechanism, that corresponds to each resource, human or otherwise, needed to carry out the defined activities;

fitting each time unit slot of a calendar with three capacity management elements, namely, the Capacity element populated with user-specified or system triggered maximum capacity of the corresponding resource, the Used element and the Remaining element;

ensuring that the sum of the value of the Used element and the value of the Remaining element be always equal to the value of the Capacity element for each calendar time unit slot;

checking the Capacity element for the unit values requested during a scheduling attempt for each time unit slot involved, claiming the requested units if the requested units are available, otherwise the scheduling is denied;

increasing the Used element of the time unit slot involved and decreasing its Remaining element by the number of requested units computationally if scheduling is allowed;

releasing the corresponding number of units upon the completion of a scheduled activity in a time unit slot by computationally decreasing its Used element and increasing its Remaining element by the number of units released;

providing the flexibility of overriding the maximum capacity value;

suggesting relative scheduling priorities of multiple activities depending on their levels of business criticality, importance, risk, and complexity captured by corresponding user-specified weight factors;

assigning high scheduling priorities to business critical, important, low risk and low complexity activities and low scheduling priorities to business uncritical, less important, high risk and high complexity activities; and generating and displaying multi-dimensional time lines with the determination and indication of critical paths.

6. The method of claim 1, further comprising resource capacity management, including human resources, logical resources, and physical resources, the method comprising the steps of:

handling the requests for resources via a workflow from receipt to approval or rejection, allocation of resources, and de-allocation of resources;

scheduling units of work against a resource, or booking a resource partially or totally for a period of time;

providing a personalized capacity-based calendar for each resource with its supporting workflow for different needs including various teams of workers, various specialties, and various disciplines, enabling automated collaboration between different parties to define resource capacity, request units based on availability, and assign the resource to the requesting node's activity, while preventing resource bandwidth overload;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems.

7. The method of claim 1, further comprising inventory tracking and, the inventory being defined as a set of asset items, or items that belong to a program or project, and being represented by a child node in the hierarchy under the node of the owning program or project, the method comprising the steps of:

dividing the inventory into different categories and tracking the categories separately;

assigning activities in parallel or serially in a user-specified sequenced order to each item of the inventory;

smart scheduling of each item/activity pair in the appropriate capacity based calendar of the required resources, each time unit slot in the calendar displaying, in visual format, information of the maximum capacity, the number of units already allocated and the remaining units available for scheduling, updating automatically this information to reflect the allocation of the units requested for the new item/activity pair and the actual time unit used in the scheduling, enabling each scheduled item/activity pair to track and monitor the progress of the execution of the requested activity, allowing interactive and collaborative updating of the tracking information related to the activity;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems.

8. The method of claim 1, further comprising assist functions that can be involved from any node in the said hierarchy or any point of any workflow, the method comprising the steps of:

controlling privileged access at each node to the assist functions through security controls;

invoking support functions recursively when needed, directly or indirectly;

invoking an assist function when needed from other assist functions, business functions and each node in the said hierarchy while the pertinent information remains localized at the invoking source;

accessing and displaying the consolidated information of each assist function from any centralized point, with cross-referenced information of the invoking node;

providing detailed and summary information in real-time, with statistical and graphical representations;

featuring collaborative workflows to enable individuals and groups of users to interact with requests, receipts, modifications, approvals, rejections, and others through the entire lifecycle of the target object;

managing the items and workflows that support the various business functions, such items and workflows comprising Attachments, Action Items, Meetings, Approvals, Business Considerations, Dependencies and Look Ahead;

providing Attachments through workflows for linking, listing, tracking, archiving, fetching, displaying, and deleting of any documents that pertain to and are associated with any node of the said hierarchy, with conditional and unconditional triggers of other functions or actions on the attachments themselves, the attachments being stored in the internal database of the method, or in an external database or file system;

providing Action Items which are assigned to one or more persons or systems and should be completed by a due date to support another assist or business function, a workflow being provided to create a nested structure of action items and track the progress of the action items through their entire lifecycle;

providing Meetings through workflow for the definition and interaction with external systems for the scheduling of meetings, and for each meeting recurrence the invitation of attendees, publishing to major stakeholders and saving of meeting agendas and minutes, action items and major decisions;

providing Approval workflows for handling approval requests and tracking of the approval process through its entire lifecycle by any group of primary and alternate approvers through collaborative interactions between requester and approvers over one or more iterations, while enabling the approvers to be sequenced in a preferred priority order list, the method further supporting nesting of approvals where a parent Approval may be contingent upon one or more child Approvals;

providing Business Considerations through workflows for defining and updating business considerations, their details and attachments, enabling their linking to any node of the hierarchy and from any point in the method, and the monitoring of the adherence to such considerations;

enabling Dependencies by adding and updating of dependency relationships, and viewing and navigating dependency chains from the invoking nodes or target dependent nodes; and enabling Look Ahead through proactive viewing of upcoming activities by specific time duration, future trends and adjusting current plans to prevent problems.

9. The method of claim 1, further comprising Budget Management, which is a business function comprising the steps of:

selecting a node in the hierarchy that represents a budget owning entity;

creating a parent umbrella budget for the node;

creating multiple Editions of the budget including Planned, Approved, To-Date, and Forecast;

defining Categories III each Edition including Hardware, Software, Payroll, and Office Supplies;

populating each category with Line Items;

organizing Line Items by operational and capital expenses;

tracking at the Line Item level;

supporting mathematical calculation of total costs of each Line Item, giving a real-time snap-shot of statistical aggregations at each level, up to the Category and Edition levels;

providing budget planning, approval, and tracking workflows at the umbrella, Edition, Category and Line Item levels;

supporting interactive collaboration and the use of assist and business functions with the pertinent information localized at the invoking source;

allowing the cloning of budgets at the umbrella, Edition, Category and Line Item levels;

providing summarized information that includes progress, warning flags that enable hyper-link access to the source of the information; and enabling condition and threshold based triggering of actions across nodes, assist/business functions, and external systems.

10. The method of claim 1, further comprising Vendor Relations Management, which is a business function comprising the steps of:

selecting a node in the hierarchy that represents an entity that has vendors associated with it;

creating Vendor objects with nesting capabilities, resulting in parent and child Vendor objects;

defining Categories in each Vendor object;

populating each category with Line Items;

tracking of transactions, purchases and their progress at the Line Item level;

providing interactive collaboration workflows to manage progress and dynamic updating and synchronization of the incurred expenses with other assist and business functions, summarizing expense data in real time at each level, from line items to categories, from categories to child Vendor object, and from child Vendor objects to the parent Vendor object;

supporting interactive collaboration and the use of assist and business functions with the pertinent information localized at the invoking source;

allowing the cloning of Vendor objects to facilitate the easy creation of new Vendor objects and their elements;

providing summarized information that includes progress, warning flags that enable hyper-link access to the source of the information; and enabling condition and threshold based triggering of actions across nodes, assist/business functions, and external systems.

11. The method of claim 1, further comprising On Call Management, which is a business function comprising the steps of:

selecting a node in the hierarchy that represents an entity that requires support over the phone by local or remote individuals or answering services, organized in a prioritized on-call list;

creating of one or more On Call Lists, each list having multiple Line Items;

populating each Line Item with the name of the person to be called, one or more contact phone numbers organized in a priority order, one or more email addresses, wait period, and alert invocation;

organizing the Line Items if a priority order of calls, or call sequence;

providing interactive workflows that enable other individuals to access an On Call list and cause conditions or thresholds that trigger actions such as automatic calling of shift person's number, alerts, notifications when the wait period is up, and calling the next person in the call sequence;

allowing On Call Lists from different nodes to be consolidated and accessed from a central location with cross referencing the information back to the invoking source;

supporting interactive collaboration and the use of assist and business functions with the pertinent information localized at the invoking source;

allowing the cloning of On Call lists to facilitate the easy creation of new On Call lists and their elements;

providing summarized information that includes progress, warning flags that enable hyper-link access to the source of the information; and enabling condition and threshold based triggering of actions across nodes, assist/business functions, and external systems.

12. The method of claim 1, further comprising Issue and Risk Management, which is a business function comprising the steps of:

selecting a node in the hierarchy that represents an entity that requires the recording and tracking of the resolution progress of any issues or risks that may be identified against that entity;

creating of Issue/Risk objects or tickets with nesting capabilities, resulting in parent and child Issue/Risk tickets;

populating each Issue/Risk ticket with information comprising the identification of the entity against which the issue or risk has been identified, the severity of the issue or risk level, a summary description of the issue or risk, detailed description of the issue or risk, the current status of the issue or risk, and the Interaction Log of the issue or risk;

maintaining an up-to-date Interaction Log by recording for each interaction information comprising the name and affiliation of the person reporting or following up on the issue or risk, the name and affiliation of the person representing the responsible party for addressing the issue or risk, the date of the interaction, the details of the exchange between the two persons, and any action items identified and their due dates;

ordering the Issue/Risk tickets by criteria comprising risk level or severity, due date, opening date, reporting entity, and responsible entity;

providing interactive collaboration workflows for managing the progress of the resolution of the issue or risk, dynamic updating of status and obtaining the required approvals, and synchronizing with other assist and business functions;

automatically creating Issue/Risk tickets and logging of risks and issues when they culminate in budget overruns or potential delays;

when such issues and risks are mitigated, information gets updated automatically in the corresponding Issue/Risk tickets;

allowing Issue/Risk tickets from different nodes to be consolidated and accessed from a central location with cross referencing the information back to the invoking source;

supporting interactive collaboration and the use of assist and business functions with the pertinent information localized at the invoking source;

allowing the cloning of Issue/Risk tickets to facilitate the easy creation of new Issue/Risk tickets and their elements;

providing summarized information that includes progress, warning flags that enable hyper-link access to the source of the information; and enabling condition and threshold based triggering of actions across nodes, assist/business functions, and external systems.

13. The method of claim 1, further comprising Change Management, which is a business function comprising the steps of:

selecting a node in the hierarchy that represents an entity the change of which over time must be managed and tracked;

creating Change Management objects or tickets with nesting capabilities, resulting in parent and child Change Management tickets;

defining Categories of change in each Change Management ticket;

populating each category with change information manually or directly from other functions and external systems;

tracking the changes with proper notifications;

collecting historical data for future reproduction;

providing a locking mechanism to prevent future modifications;

providing interactive collaboration workflows for managing the progress and dynamic updating and synchronizing with other assist and business functions;

allowing Change Management tickets from different nodes to be consolidated and accessed from a central location with cross referencing the information back to the invoking source;

supporting interactive collaboration and the use of assist and business functions with the pertinent information localized at the invoking source;

allowing the cloning of Change Management tickets to facilitate the easy creation of new Change Management tickets and their elements;

providing summarized information that includes progress, warning flags that enable hyper-link access to the source of the information; and enabling condition and threshold based triggering of actions across nodes, assist/business functions, and external systems.

14. The method of claim 1, further supporting a user interface comprising the organizational steps of:

dividing the display area other than menu and tool bars into a vertical command list of business functions to the left of the screen, a horizontal list of support function buttons at the top of the screen, and a data display pane at the center;

further dividing the data display pane into three panes, one vertical to the left called the Hierarchy Pane and two horizontal panes to the right, the List View Pane at the top and the Detail Pane at the bottom;

displaying the said hierarchy using a tree control in the vertical Hierarchy Pane with the ability to expand and collapse any part of the tree, access any of its nodes and invoke any of the business and support functions at that node using right button of mouse to list the functions and left button of the mouse to invoke a function;

displaying the content of a selected node from the hierarchy tree or a parent or child node via the step-up and step-down ability using a list view control in the List View Pane to the right, showing in a user-defined format a summary of important attributes and status flags of each object belonging to the selected node in a single line of the list, and including command buttons on each line for viewing, editing and deleting the object represented by the line;

the summary attribute controls/formats enabling dynamic access to the base function, source or attribute where the information resides;

the List View Pane further enabling dynamic access to and display of pertinent summarized information for each of the assist and business functions, with the capability to step up and down their nested structures;

displaying in the Detail Pane detailed reports and status information in the context of any node, including detailed information of any object selected from the list view in a view mode if the view button from the object summary line in the list view is pressed and in the edit mode if the edit button is pressed, Save and Cancel buttons being provided in the Detail Pane to save or cancel changes made in the edit mode;

enabling any hierarchy node from the Hierarchy pane to display the said hierarchy in a new pane, Detailed Mirror Pane that allows a selection of nodes, and the selected nodes get inserted in a new, Detailed Mirror Pane that allows establishment of relationship links including Pre-Requisite, Post-Requisite, Required and Reference between the invoking node and selected nodes, and formalizing of the inter-linked relationship between the selected nodes and the invoking node, where in making the information of the links and inter-linked nodes accessible and displayable at any either linked nodes through the List View Pane;

enabling the creation of Items List nodes in the said hierarchy for storing a list of items such as inventory or asset items, displaying an Items List Pane for defining and populating the list of items, and invoking the Asset Scheduler and Tracker function at an Items List node;

further enabling in the Items List Pane the defining, modifying and deleting of item categories and items within each category, the assignment of additional information attributes for each item within each category, and the filtering and sorting of items and categories;

linking Activities from the parent node in the Items List Pane to items within each category, in a specific sequence or randomly, making the linked items accessible at each activity through a selection link referred to as Items in the summarization pane where the activities are displayed as children nodes, where the Items link opens up an Items Pane comprising of an interactive calendar with time units for unlimited owners;

enabling display and tracking, through interactive time unit slots in the Items Pane, of maximum capacity value that is process or user defined per time unit, the Used or Utilized units and the Remaining or Available units;

further enabling the assignment of Item/Activity pairs to an entity responsible for completing the activity that owns the time unit slots on the calendar, and displaying and maintaining the resulting updates by processor of the Utilized and Available values of the impacted time unit slots;

further enabling the Items Pane to track detailed progress of the execution progress of Item/Activity pairs against the assigned Performing Teams;

allowing the interactive calendar time unit slots to track items for business functions including an Asset Tracker and Scheduler and Resource Capacity Management, and enabling at-a-glance view of the maximum capacity set per time unit slot, the Utilized value, and the Available value, and the assigning of the remaining values to the invoking item automatically and through workflows;

providing universal access and maximum flexibility by maintaining the ability, at any point of the method and in the context of any object, to access and invoke any function from the vertical command list of business functions, the horizontal command list of assist functions at the top of the screen, the function list of any hierarchy node, or external functions;

always displaying hierarchical information in the Hierarchy Pane, summary information in the List View Pane, detailed information in the Detail Pane, hierarchy node selection in the Mirror Pane, Formalization of selected nodes' relationship in the Detailed Mirror Pane, creation of items in the Items List Pane, and assigning time units and tracking detailed progress activities in Items Pane;

providing in each pane, user interface controls comprising create, modify, display, and organization of massive detail information in tab-based categorization or other formats, statistical summary in single line-item, nested structure or other formats, graphical representation of information, or a combination of any of these formats, each node of the said hierarchy providing the context for accessing any of the user interface panes;

allowing in each pane, when applicable, interactive and collaborative operations with or without security controls as to who can access which part of the target information;

supporting in each pane hyperlink access to the underlying information that can be accessed speedily through the displayed indicators, flags and graphical representation.

15. A computer implemented system for the management of divisional entities and extremely large programs and projects, the computer implemented system comprising of:

a computer;

a software program stored on the computer wherein the software program is adapted to:

building a nested hierarchy of nodes representing multiple logical and geographic partitions of a local or global divisional Enterprise or Government entity, and wherein the mega-programs and mega-projects that can span several of those partitions; navigating the hierarchy from a top node or major node, which represents a mega-program, all the way down to the nodes representing division departments and projects, their activities, resources and assets allows real-time access to and step-up or step-down through each node's status information including status report, summary, and key performance indicators;

collaboratively invoking business functions, wherein the business functions are Resource Capacity Management, Asset Tracking and Scheduling, Budget Management, On-Call Management, Vendor Relations Management, Issue/Risk Management, and Change Management and assist/support functions, wherein the assist/support functions are Business Considerations, Dependencies, Status Reports, Approvals, Action Items, Attachments, and Meetings, at any node, establishing that node as the context for the current user-requested operation, that is, any function invoked at any source node or other point will retain its relevant information at the source, localizing the information that can be accessed directly from the source;

supporting bi-directional flow of information, with access to the information of the paired nodes from either end, with controls at each node to enable summarization or expansion of information, and automated or manual updates with override ability;

allowing multiple users to create, view, update and delete, any object and all pertinent information in the said hierarchy collaboratively and interactively;

enabling the implementation and tracking of various business processes, workflows, and condition and threshold based triggers;

further enabling the implementation and following of government, industry standard or organization-customized business, operation or administrative structure, involving several levels of nesting to capture the complexity of certain standard structures, and further enabling the invocation of access, display, updating and other actions from any selected node in the hierarchy;

allowing the recording, monitoring and auditing of all business considerations, including security and compliance governance, such business considerations and their supporting details involving several levels of nesting to capture the complexity of some considerations, further enabling the linking of these considerations to any node in the hierarchy, and tracking collaboratively their related information and attachments, including status information within the context of each invoking node or other invoking points;

storing related data elements of the method in one or more databases; and allowing the said hierarchy and the said business and assist functions to operate in one integrated, all-encompassing method that can be invoked from every node while localizing the pertinent information at the invoking node; and real-time updating and viewing of the status information of all nodes in the said hierarchy by multiple users collaboratively according to specific criteria including time or schedule, business criticality, complexity, risk, and compliance requirements depicted in statistical, graphical, and visual flag formats, enabling intelligence progress management that accounts for the said criteria in addition to traditional criteria such as the numbers of tasks completed and tasks remaining relative to the total number of tasks and elapsed time relative to allocated time;

computing the completion percentage at a node representing an activity such as a task, project, program and mega-program as a weighted average of the completion percentages of their child nodes, the weight factors being user-specified or system-computed;

assigning severity or priority levels to the said criteria such as business importance criticality, complexity and risk, high weight factors being assigned to high severity or priority levels, emphasizing the completion of high severity or high priority activities and deemphasizing the completion of simple, low severity or priority activities in the overall computed completion percentage;

carrying out the computation of completed percentages automatically up the hierarchy all the way from the bottom leaf nodes to the highest owning node, the values of the sibling nodes being averaged through computation and the resulting value being propagated to the parent node, and assigned to it;

providing the option to manually override the automatic progression of information with user-defined information at each node, which is in turn used for computation to derive the resulting value that is propagated upwards to its parent node;

mapping the method and user definable values of the input criteria for weight, importance criticality, complexity and risk through arrays or matrices;

controlling the flow of information from sibling nodes to parent nodes to be automatic, manual or through other defined criteria;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems;

notifying proactively users who are involved at a given node of the said hierarchy whenever the actual progress corresponding to that node falls behind the computed expected progress;

providing notification methods that include colored and flashing visual flags combined with verbiage in the user interface depending on the severity of the delays;

propagating progress and notification indicators upward throughout the hierarchy automatically, computing the resulting status indicator at each node from the status indicators of its child nodes using method or user defined logic;

providing the option of overriding the received information at any node from its child nodes with user-specified values and status indicators, computing new values in conjunction with subordinate child nodes and propagating the resulting value up to the parent node;

providing display and update access to each node's and its immediate child nodes' information including details, summaries and graphical representations;

enabling upward and downward navigation from a node indicating the presence of exceptions or issues to the dependent nodes where the exceptions originated, allowing for quick root cause analysis;

controlling the flow of information from sibling nodes to parent nodes to be automatic, manual or through other defined criteria;

supporting interactive collaboration and the use of assist and business functions with the pertinent information localized at the invoking source;

providing summarized information that includes progress, warning flags that enable hyper-link access to the source of the information; and enabling condition and threshold based triggering of actions across nodes, assist/business functions, and external systems;

generating reports that can provide any information from any node of the said hierarchy, a collection of such nodes, and any of the assist and business functions;

accessing assist functions from the context of the report;

presenting real-time and static information in any format, including statistical and graphical tables and charts;

hyperlinking the values and fields displayed in the reports to provide direct access to the source of the information and enable creation, modification, deletion and other operations on the values reported;

consolidating reports and making them securely accessible, downloadable and printable from a central location;

maintaining history of reports for audit or other purposes;

providing the necessary information in real-time to every functional, technical and management layer, consolidating and/or summarizing the data at each level up, all the way into executive reports for the company's executives and parent company;

enabling through a workflow interactive collaboration between people, systems and processes;

generating Look Ahead reports which are interactive reports that can be invoked from any node to compile proactive views of upcoming activities by specific time duration or future trends, allowing for adjustments of current plans to prevent problems including delays and runaway budgets; and enabling condition and threshold based triggering of actions across nodes, assist/business functions, and external systems, including alerts and warning flags.

* * * * *